United States Patent [19]
Vitunac et al.

[11] Patent Number: 5,246,174
[45] Date of Patent: Sep. 21, 1993

[54] APPARATUS FOR RECYCLING GLASS

[75] Inventors: Edward A. Vitunac, Pittsburgh; Edward A. Zawadzki, Wexford, both of Pa.

[73] Assignee: Falcon United Ltd., Wexford, Pa.

[21] Appl. No.: 986,689

[22] Filed: Dec. 8, 1992

Related U.S. Application Data

[62] Division of Ser. No. 805,260, Dec. 9, 1991.

[51] Int. Cl.$^5$ .............................................. B02C 19/12
[52] U.S. Cl. ................................ 241/94; 241/DIG. 38
[58] Field of Search .................... 241/14, 15, 20, 24, 241/60, 70, 78, 79.1, 83, 84.3, 94, 99, DIG. 38

[56] References Cited

U.S. PATENT DOCUMENTS

| | | | |
|---|---|---|---|
| 4,637,559 | 1/1987 | Bowling et al. | 241/94 |
| 4,784,334 | 11/1988 | Van DerVear et al. | 241/94 X |

OTHER PUBLICATIONS

General Kinematics, Vibrating Drum, 1986.
General Kinematics Innovations, 1986.
Vibra-Buster, 1988.
Vibra-Tor Processor, 1986.
Recycle Construction/Demolition Waste, 1991.
Onmi-Screener, 1988.
Kinematics High Frequency Screeners, 1983.
Vibrating Drum, 1989.
Lost Foam Integrated Sand System, May 1988.
The Un-Coaler Activator/Feeder.
Kinematics High Frequency Screeners, 1983.

*Primary Examiner*—Douglas D. Watts
*Attorney, Agent, or Firm*—Kirkpatrick & Lockhart

[57] ABSTRACT

A process and apparatus are provided for breaking the glass components of articles comprised of glass and nonglass components and liberating the glass components from the nonglass components by subjecting the articles to controlled vibrations sufficient to break the glass without breaking the nonglass components. The apparatus is a vibratory device having a screen deck and a plate deck. The screen deck has holes through which the broken glass falls to the plate deck. The nonglass components remain on the screen deck. Thereafter, the nonglass components are removed by one or more of a variety of means. The glass may be further processed by cleaning, rinsing and further crushing to size the glass pieces. Glass of different types may optionally be separated by taking advantage of the differences in specific gravities between glass types.

6 Claims, 15 Drawing Sheets

GLASS RECYCLE PROCESS

Fig.16. GLASS COMPOSITION

APPARATUS FOR RECYCLING GLASS

This is a divisional of copending U.S. patent application Ser. No. 07/805,260 filed on Dec. 9, 1991.

BACKGROUND OF THE INVENTION

Description of the Invention Background

In 1990, an estimated 18-20 million television sets were sold in the United States. A single television manufacturing facility may produce from 7,000 to about 15,000 television picture tubes per day. Of these, between about five to seven percent are rejected due to some defect rendering them unsuitable for sale. Thus, at a single manufacturing facility, hundreds of TV tubes are discarded each day amounting to several hundred tons of TV tube waste each month. The traditional means of disposing of the waste has been to put it in land fills.

A television tube typically contains glass components and nonglass components. The glass components include a front panel, which is up to two inches thick in places, and a conical funnel section. The nonglass components include paper, plastics, ceramics and metals in the form of the electronic gun, clips, masks, straps and a lead frit used to join the panel glass to the funnel glass. A graphite acrylic coating typically is applied to the external surfaces of the panel glass and the funnel glass. The internal surface of the panel glass is also coated with, for example, aluminum, phosphor and graphite. The internal surface of the funnel glass may be coated with graphite, iron oxide and sodium silicate.

Because the glass TV tubes exhibit toxic waste characteristics due to leaching of lead from the frit and funnel, they are disposed of as a hazardous waste. Simply burying the TV tubes is no longer permissible. Transport of the waste to approved toxic land fills is costly.

Heretofore, there has been no effective means of recycling the waste TV tubes or other articles made of glass and nonglass components. The structural mixture of glass and nonglass components and the inorganic and organic coatings on the glass in TV tubes makes them unacceptable for recycling by conventional glass or metal recycling methods. In addition, the ceramic components in the TV tubes would poison the glass for most further uses if the glass and ceramics are mixed. Avoiding such a mixture was heretofore very difficult. Crushing the discarded TV tubes by conventional means only inextricably mixes the glass and nonglass components. The safe disposal and/or recycling of TV tubes and similar mixed glass and nonglass articles has become a problem.

There is a need for a process for separating the glass and nonglass components of a TV tube or similarly structured article. There is a further need for a process for sizing and cleaning the separated glass for recycling. Finally, there is a need for a process for separating different types of glass, such as the panel glass from the funnel glass, in an economic and easy to use process.

SUMMARY OF THE INVENTION

The process of the present invention involves generally coarse breaking of the glass to liberate it from the nonglass components followed by separation of the glass and nonglass components. It may be advantageous to size the glass and clean it for storage and further use. A feed stock of waste materials, including articles and portions thereof made of glass and nonglass components, articles and portions thereof made of glass, glass shards, and combinations thereof, is subjected to vibrations in a vibratory apparatus at a frequency, impact force, and for a period of time effective for breaking substantially all of the glass components into pieces of glass of a first size range and for liberating from the nonglass components generally all of the glass connected to such nonglass components. Thereafter, the nonglass components present in the feed stock are separated from the pieces of glass, either in the vibratory apparatus or outside of such apparatus.

The process also preferably includes the steps of removing any coating from the glass, rinsing the glass and sizing the glass by subjecting it to one or more vibrating crushing steps to break the pieces of glass into a second or third range of sizes. The preferred method of removing coatings is to bathe the glass in acid in a vibratory circular conveyor. The composition of the bath depends on the kind of coatings to be removed. The preferred method of rinsing is by means of a countercurrent washing operation. Alternatively, the glass pieces may simply be sprayed with water or some other rinsing agent until the residue from the bath is removed.

An optional step in the process permits separation of two types of glass having different specific gravities.

Prior to using the glass in a further glass making process, samples of the glass may be removed for analysis of the glass composition.

The vibratory apparatus of the present invention used for the initial coarse breaking of the glass and liberation of the glass from nonglass components includes an inlet, a first deck and a second deck. The first deck has an elevated surface, a step, a lower surface and a first outlet. The second deck has a second outlet. Means are provided for vibrating the first deck at a predetermined frequency. Openings in the elevated and lower surfaces of the first deck are sized to permit items of a desired size, such as broken glass, to fall through the openings to the second deck and exit through the second outlet. Items larger than the desired size, such as the nonglass components, remain on the first deck and exit through the first outlet.

DESCRIPTION OF THE DRAWINGS

The present invention can be better understood by reference to the drawings which are intended to be illustrative only of the preferred embodiments of the process and apparatus of the present invention.

DETAILED DESCRIPTION OF A PREFERRED EMBODIMENT

Figure 8:
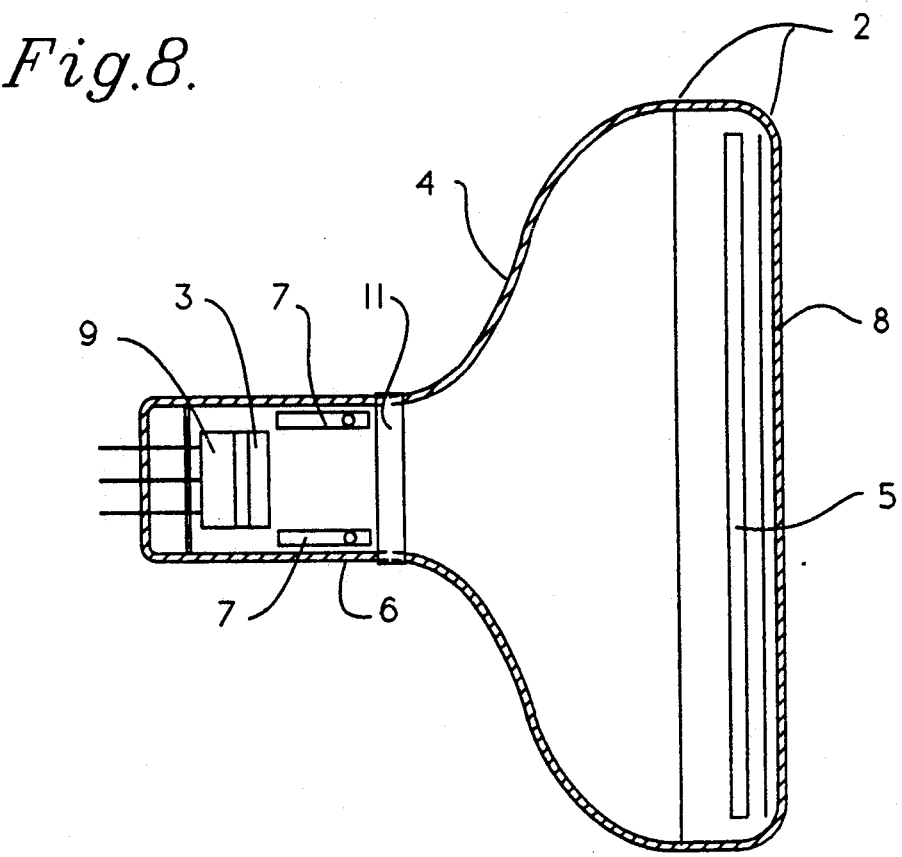
FIG. 8 is a side section view of a typical television tube.

FIGS. I through 14 illustrate the various embodiments of the process and apparatus of the present invention. The process of the present invention will be described in terms of separating the glass from the nonglass components of television, or TV, picture tubes and the further processing of the liberated glass. As shown in FIG. 8, a typical TV tube includes a panel section 2 and a funnel section 4. In the panel section 2, progressing from the front to the back (right to left in the Figure), is the screen 8, a layer of phosphor and other coatings and a metal shadow mask 5. In the neck 6 of the funnel section, are deflection electrodes 7, having metal parts, a copper focusing grid 3 and an electron gun 9, encapsulated in a ceramic housing. Stainless steel straps 11 surround the neck 6. Those skilled in the art will recognize that the process and apparatus described herein can be used to separate glass and nonglass components of other kinds of articles made of such interconnected materials. In addition, glass alone may be processed by the techniques of the present invention for sizing, cleaning and separation of glass types as desired.

Figure 1:
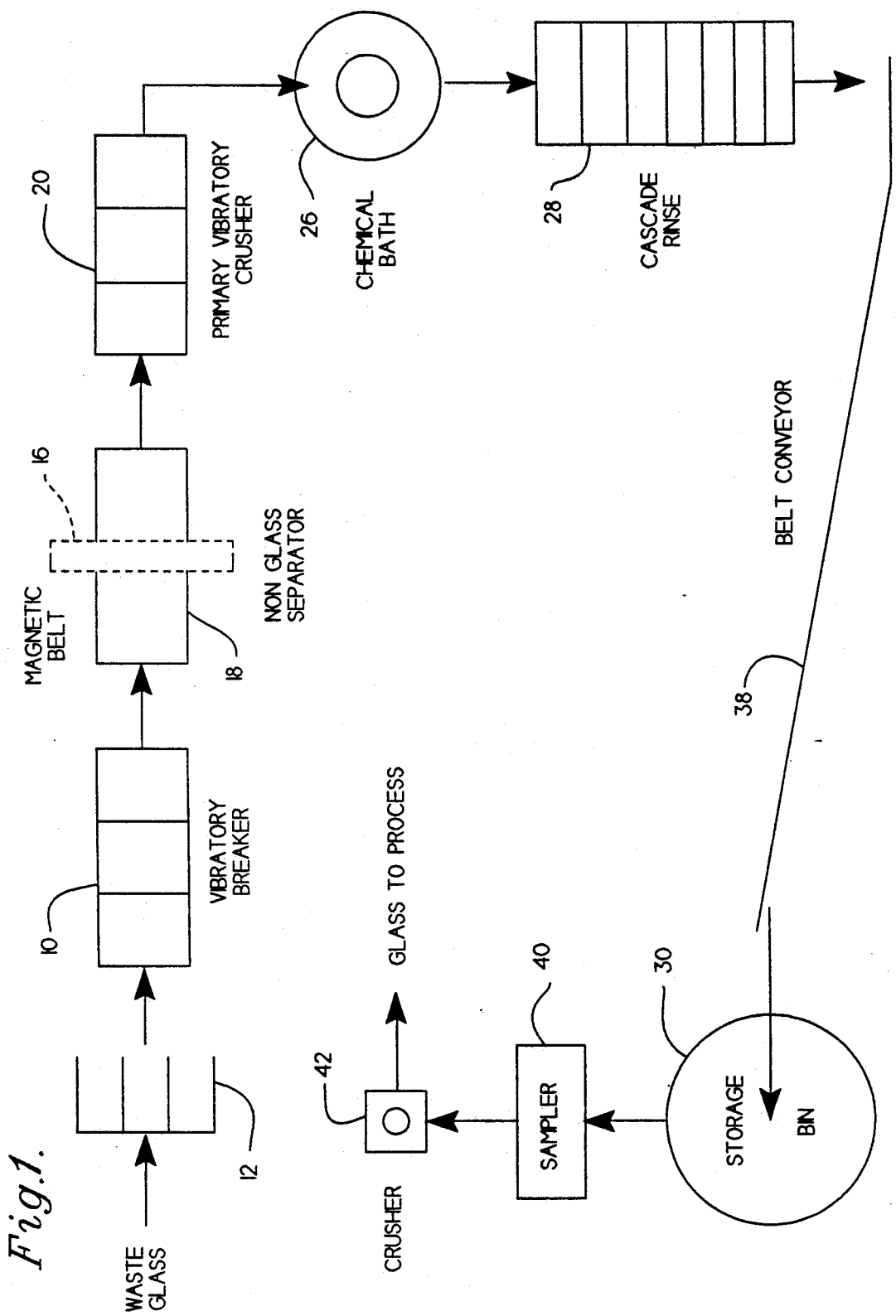
FIG. 1 is a schematic view of the steps of one embodiment of the process of the present invention.

Referring to FIG. 1, waste glass including reject whole and broken TV tubes and/or shards of glass from various glass making operations are transferred to a vibratory breaker 10 wherein the glass components of the TV tubes are liberated from the nonglass components and broken into coarse pieces of a first size range. Thereafter, the broken glass and the nonglass components are separated. Fine magnetic materials can be separated by means of a magnetic conveyor 16. Fine nonmagnetic materials such as paper, plastic and light density nonmagnetic metals can be separated by air classification. Large nonglass parts, such as the electron gun and ceramics can be removed by hand.

Figure 2:
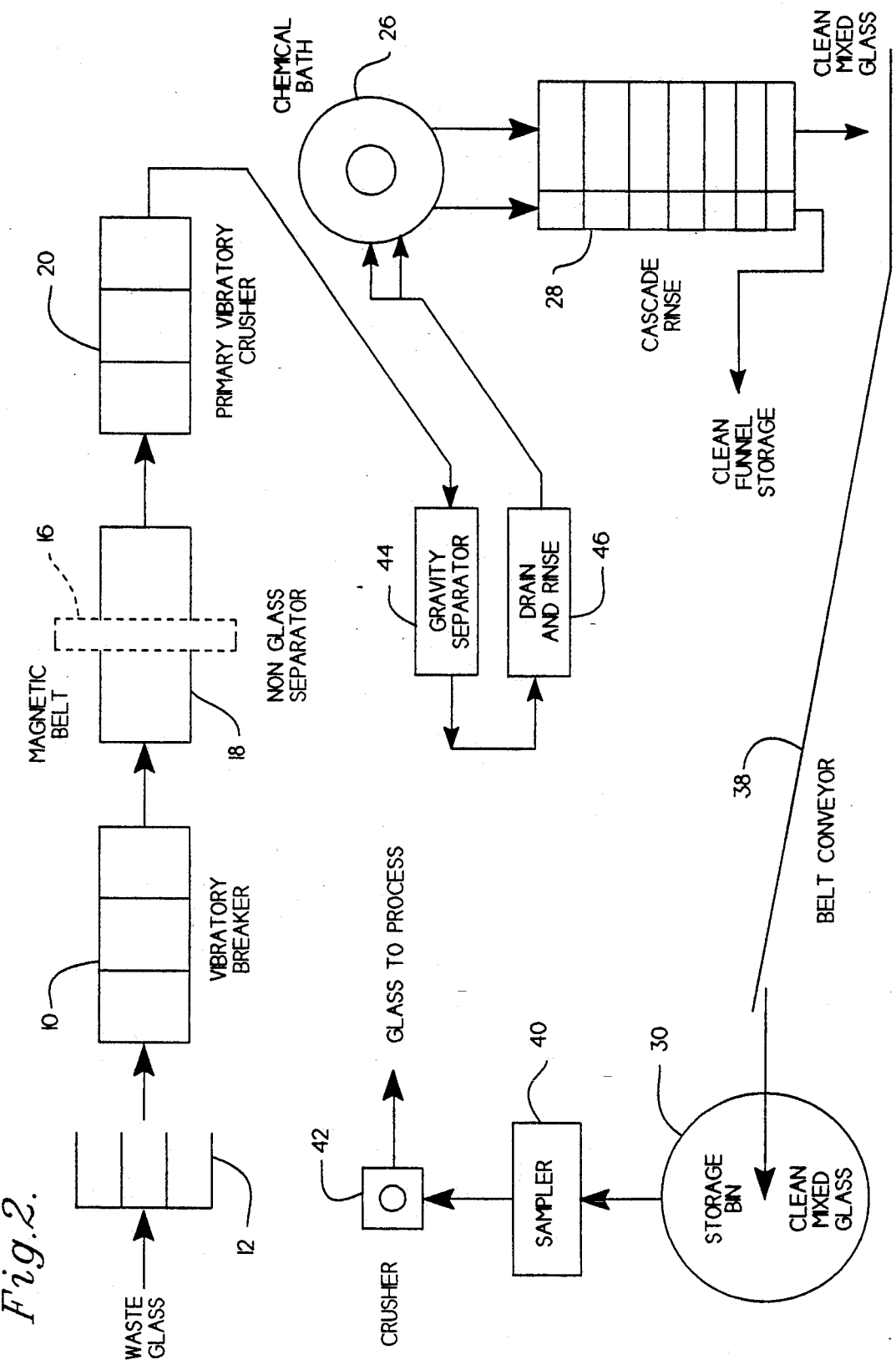
FIG. 2 is a schematic view of the steps of an alternative embodiment of the process of the present invention.
Figure 3:
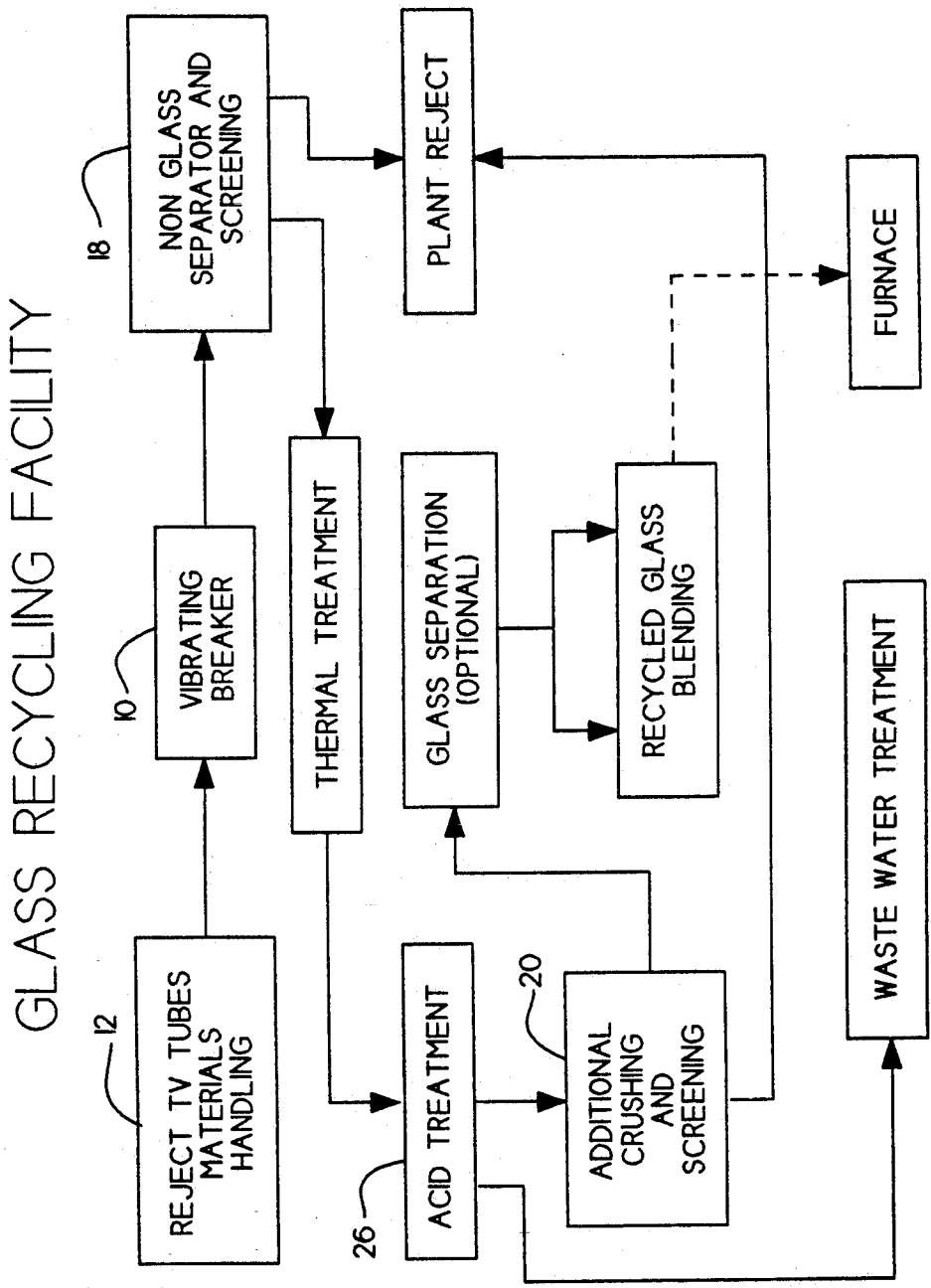
FIG. 3 is a schematic view of the steps of another alternative embodiment of the process of the present invention.
Figure 4:
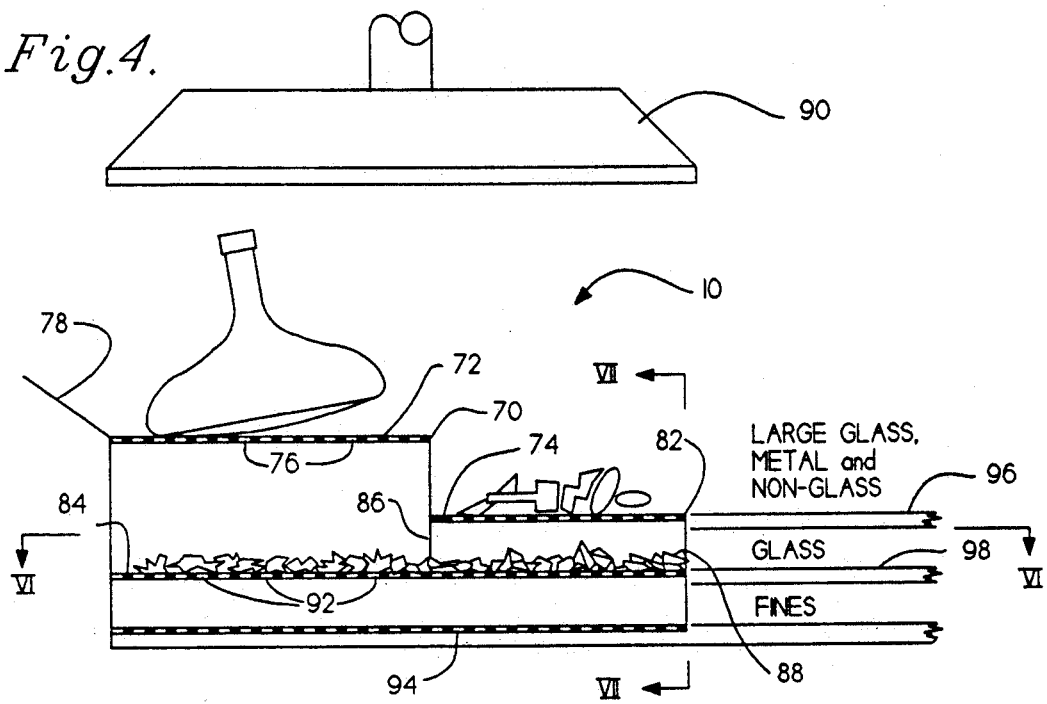
FIG. 4 is a diagrammatic side section view of the vibratory breaker of the present invention.
Figure 5:
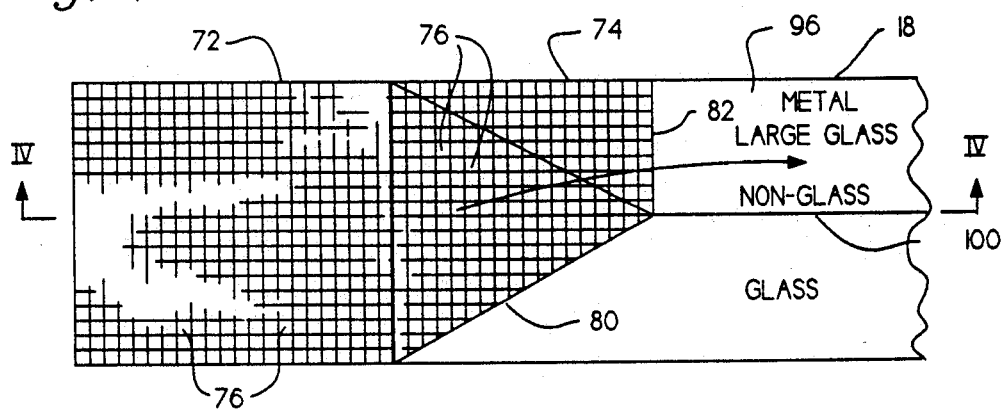
FIG. 5 is a top plan view of the vibratory breaker of FIG. 4.
Figure 6:
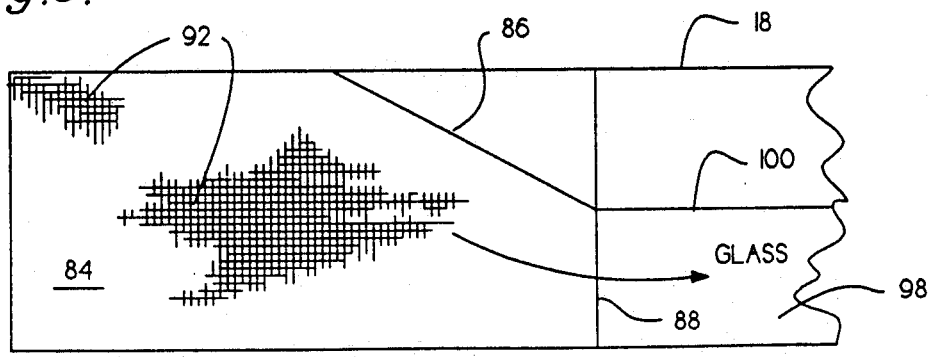
FIG. 6 is a section view of the vibratory breaker through the lines VI—VI of FIG. 4.
Figure 7:
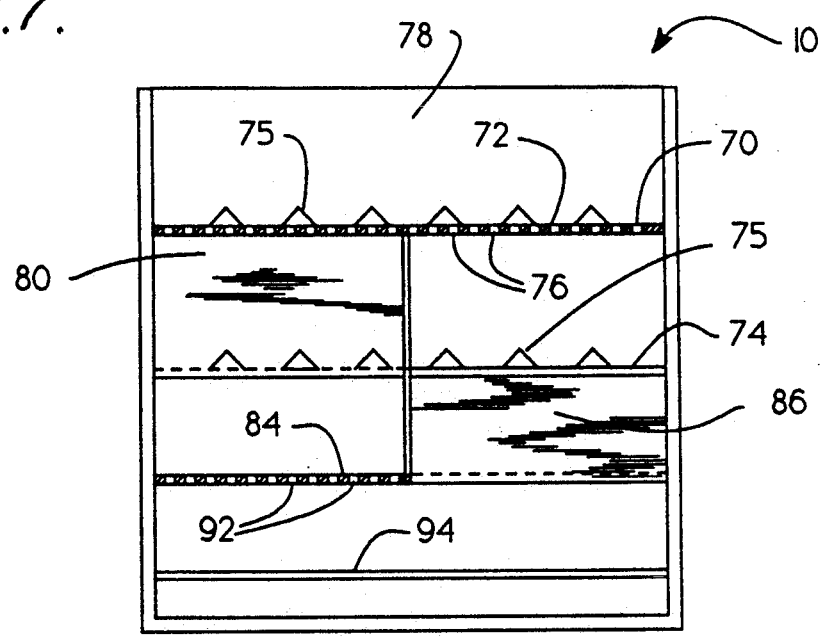
FIG. 7 is a front section view of the vibratory breaker through the lines VII—VII of FIG. 4.
Figure 14:
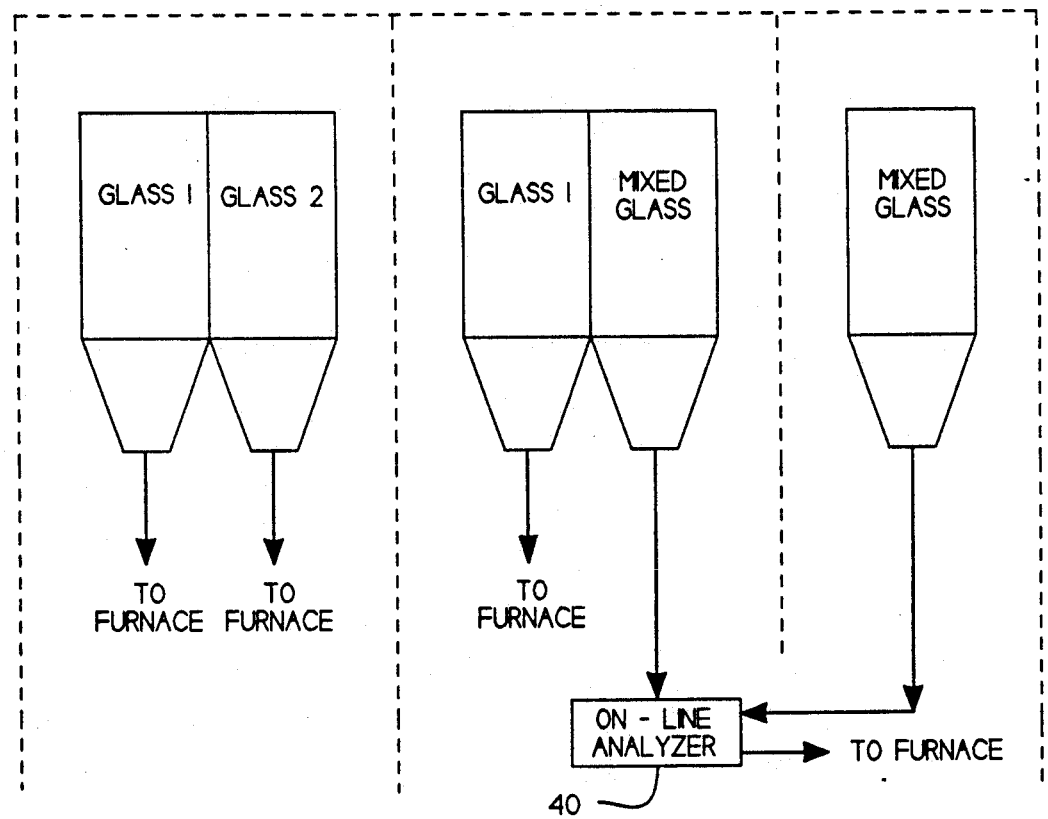
FIG. 14 is a schematic showing the process options with respect to separation and use of glass types.

The coarse glass pieces are then crushed again, preferably in a primary vibratory crusher 20, to a second desired size range. If desired, the panel glass may be separated from the funnel glass at this time, as shown in FIG. 2. The glass is then cleaned in a chemical bath 26 to remove coatings from the glass surface. The cleaning and rinsing steps may be done earlier in the process, prior to the further crushing of the coarse glass, as shown in FIG. 3, or after further crushing as shown in FIGS. 1 and 2. Following the cleaning step, the glass is rinsed, preferably in a cascade rinser 28, and passed to a storage bin 30 for eventual mixture with raw materials for new glass for use in making new glass components. A glass sampler 40 may be provided to sample and analyze the glass composition prior to use. In an optional step, the glass may pass to a secondary crusher 42 to be further reduced to a third size range either prior to passage to the storage bins 30 or before mixture with glass raw materials in a furnace. FIG. 14 shows the preferred target size distributions of the glass at each stage of the process.

Each step of the process will now be described in more detail.

VIBRATORY BREAKING

Referring to FIGS. 1 and 8, shards of glass, broken and whole glass articles and broken and whole reject TV tubes or similar glass and nonglass composite articles or combinations thereof are withdrawn from one or more elevated receiving hoppers or bins 12 by a vibratory feeder or a belt feeder to a belt conveyor 14 for transfer to a vibratory breaker 10, such as the one shown in FIGS. 4-7. The purpose of the breaker 10 is to liberate the glass from the nonglass components by reducing the glass to a manageable size without production of significant quantities of fines. It has been found that pieces within a range of less than about six inches are manageable. The vibratory breaker 10 creates a predetermined and controlled vibrating action which causes the glass to break but does not reduce or break the nonglass components such as the core, electron guns, metal masks and binding straps. Significantly, the vibrating action is such that it does not crush the ceramic components of the TV tubes. The physical characteristics of ceramics and glass are very close. Separating the two by known processes is very difficult. A frequency of vibrations of between about 900 to about 1800 cycles per minute and a stroke length ranging from ⅛ to about ¼ inches with acceleration forces of 3 to 15 G are preferred. Tests have shown that a frequency of 1800 cycles per minute, a stroke length of 3/16 inch and an acceleration of 14.3775 G are successful in separating glass and nonglass and in breaking the glass to the desired manageable size. The vibrations can be adjusted for different types of feed stock.

The vibratory breaker 10 is a modified lumpbreaker attrition mill similar to those used commercially to reduce the size of no-bake sand lumps to the original grain size. The decks have been modified and the channeling structures have been added to accommodate the present invention. Referring to FIGS. 4-7, the vibratory breaker 10 includes a stepped screen deck 70 having an elevated surface 72 and a lower surface 74. The depth of the step in the screen deck 70 between the elevated and lower surfaces 72, 74, is about 8 to 15 inches in the preferred embodiment of the breaker 10. The step permits the whole TV tubes to fall face down onto the lower surface 74. The elevated and lower surfaces each include projections 75 to provide impact surfaces on the deck 70 and holes 76 through which glass of a predetermined size will fall when the vibrations break the glass. The holes are sized so that larger glass pieces and the nonglass components will not fall through them. An inlet 78 leads to the elevated surface 72 of the screen deck 70. A wall 80 on the lower surface 74 of the screen deck directs the nonglass and any large glass components to a first outlet 82. One end of the wall 80 is adjacent the step and the other end is adjacent the outlet 82.

A plate deck 84 lies beneath the screen deck 70 and receives broken glass through the holes 76. A wall 86 on the plate deck 84 directs the flow of broken glass to a second outlet 88. One end of the wall 86 is adjacent the outlet 88.

A dust collector 90 is preferably operatively connected to the vibratory breaker 10 to remove any fines produced in the coarse breaking of the glass. Fines are particles smaller than about 28 mesh. The plate deck 84 may also have very fine holes 92 (slightly larger than about 28 mesh) so the fines fall through the plate deck 84 to a bottom deck 94 where they are discarded to a waste bin or diverted away from the larger pieces of recyclable glass. The fines are preferably removed because treating the fines in the chemical bath significantly increases the costs of the overall process.

Figure 9:
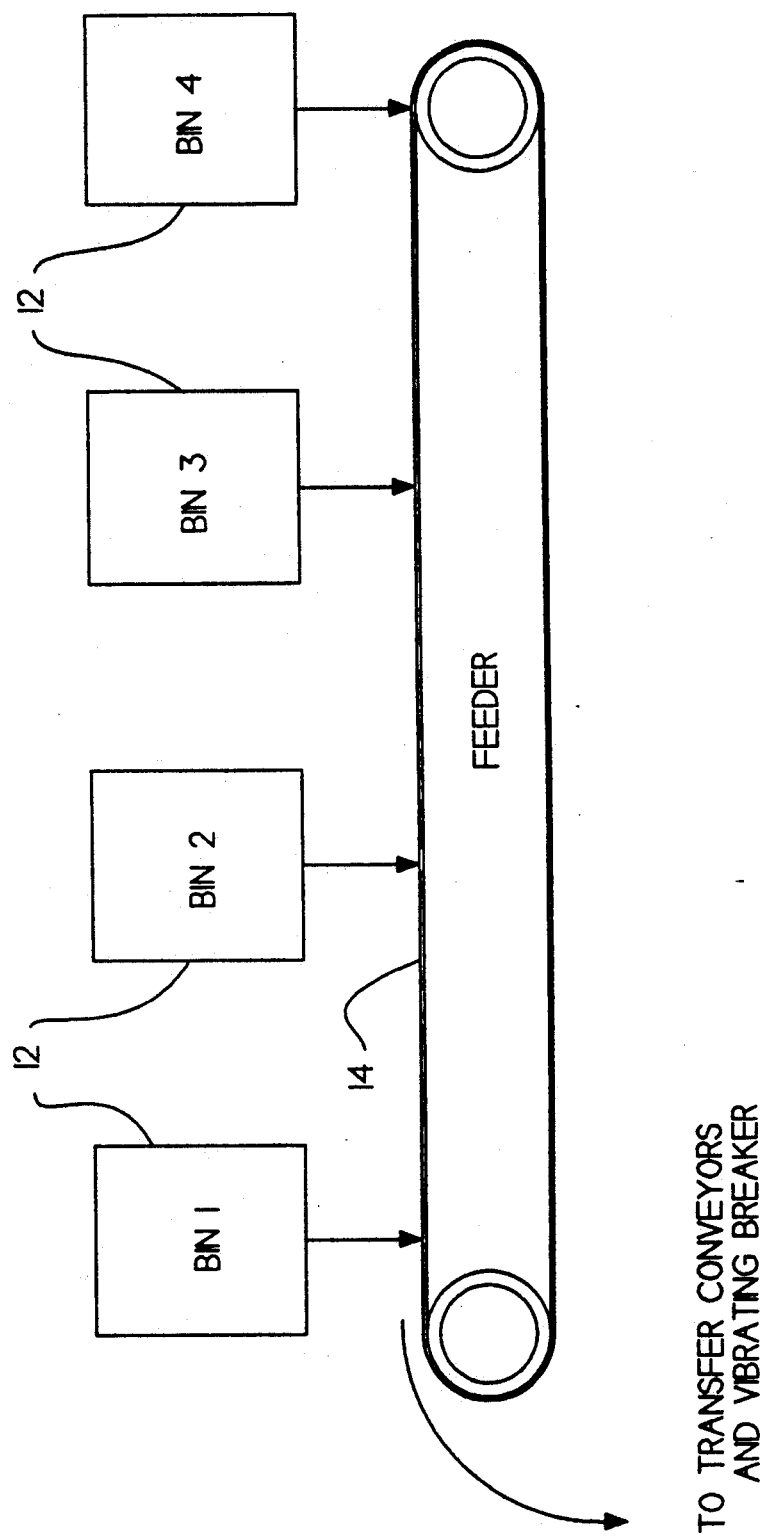
FIG. 9 is a schematic view of a preferred materials handling system for delivering recyclable materials to the vibratory breaker.

The larger glass pieces and the nonglass components flow across the lower surface 74 of the screen deck 70, out of outlet 82 to a first channel 96 in a vibratory conveyor 18. The smaller pieces of glass flow across plate deck 84, out of outlet 88 to a second channel 98 in the vibratory conveyor 18. The channels may be side by side, separated by a partition or wall 100. Alternatively, one of the channels may be above the other. The large, heavier nonglass components, such as the ceramic components and the electron gun may be removed by hand while moving along the conveyor as shown in FIG. 9.

In the most simple embodiment, there may be only one channel wherein all of the broken glass and nonglass components would progress together.

SEPARATION OF GLASS AND NONGLASS COMPONENTS

An air mag separator, or vibratory classifier, is preferably employed at this stage to remove light weight waste that has a large surface area to weight ratio; such as, paper, metal straps, buttons, fabric, and plastic, from the stream by air classification. Vibratory action together with high velocity, low pressure air fluidize and stratify material in a known manner according to differences in the terminal velocity of particles. Materials move along a conveyor by vibratory action with high density material settling to the bottom of a trough in the apparatus. A high velocity (10,000 Ft/Min. to 15,000 Ft/Min. from 4,000 to 8,000 SCFM per foot of width) of low pressure air stream is directed through the material. The material is conveyed into the airstream. Heavy material falls to a secondary separator surface. Lighter material is carried by the air stream to another conveyor for discharge to a waste bin. The magnetic belt 16 passes above the conveyor to draw any magnetic waste and direct it to a receiving bin 24. Other nonglass waste is directed to a second receiving bin 25. Air classification systems, air mag separators and magnetic belts are commercially available.

Figure 10:
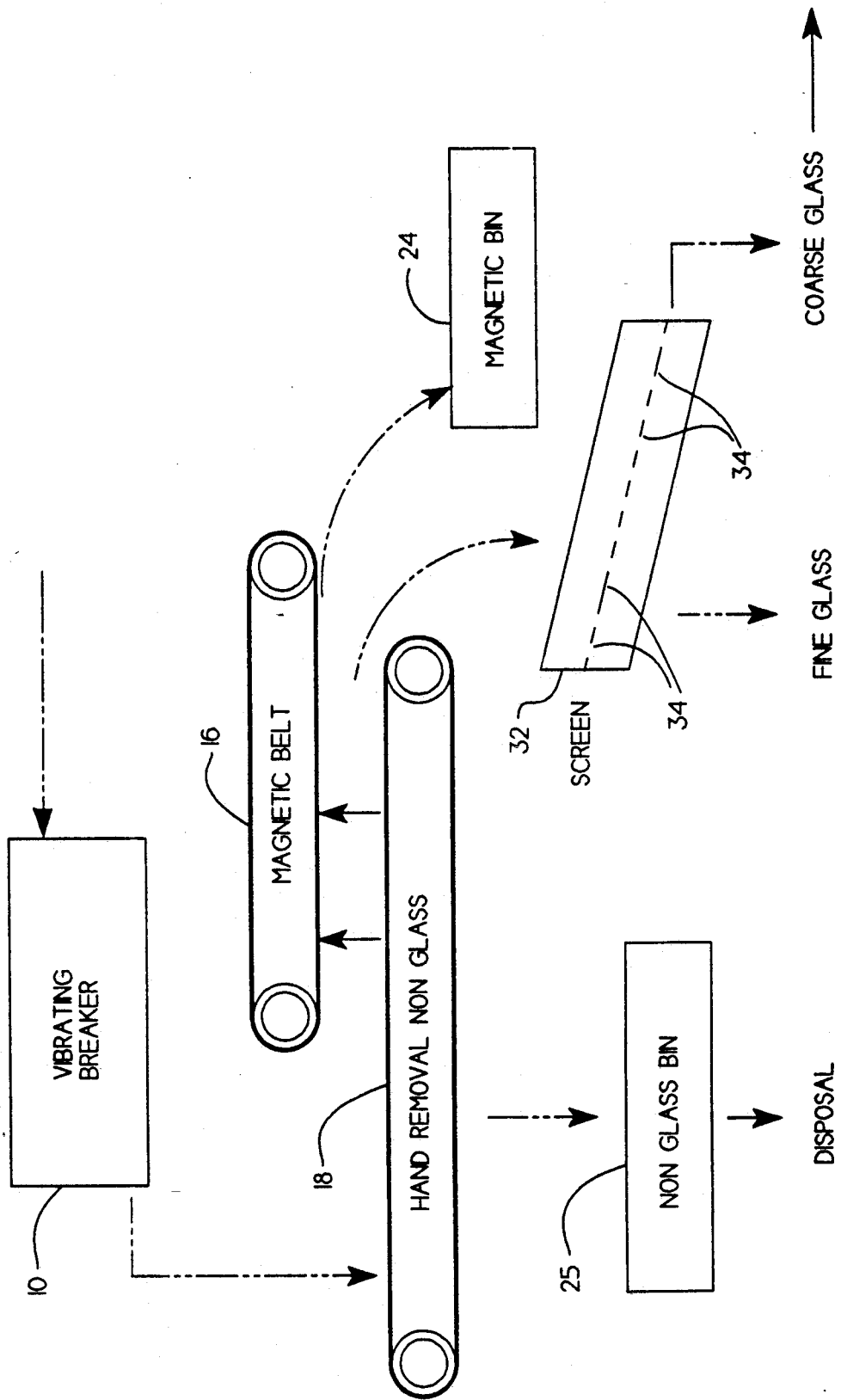
FIG. 10 is a schematic view of the initial breaking and separation steps of the process of FIGS. 1-3.

As shown in FIG. 10, the coarse broken glass remaining is preferably directed to a screen deck 32 having holes 34 of about 28 mesh, sized to permit the glass fines to fall through the holes 34 to remove the fines from the stream of broken glass. The coarse broken glass which does not fall through the holes 34 in the screen deck 32 is directed on to further processing. The means of removing fines via the screen deck 32 may be used instead of or in addition to the fines removal deck in the vibratory breaker 10.

GLASS SIZING

At this stage, the process may take several alternative directions. As shown in FIG. I, the coarse glass may be directed to a primary vibratory crusher 20 where the glass is further reduced in size to pieces no larger than about 4 inches. The vibratory crusher 20 may be any suitable commercially available device of this type, such as an impact crusher used to crush stone or various types of ores. A hammermill is one type of impact crusher. Generally, its design is a box with an inlet located at its top for gravity fed material to be crushed and a discharge at its bottom. A driven shaft is located between the inlet and outlet which has a series of swinging bars called hammers that are located radially along its length. They are attached to the shaft with a pivoting joint. Material to be crushed is impacted by the centrifugal force of these hammers which also throw material against impact plates.

Figure 2A:
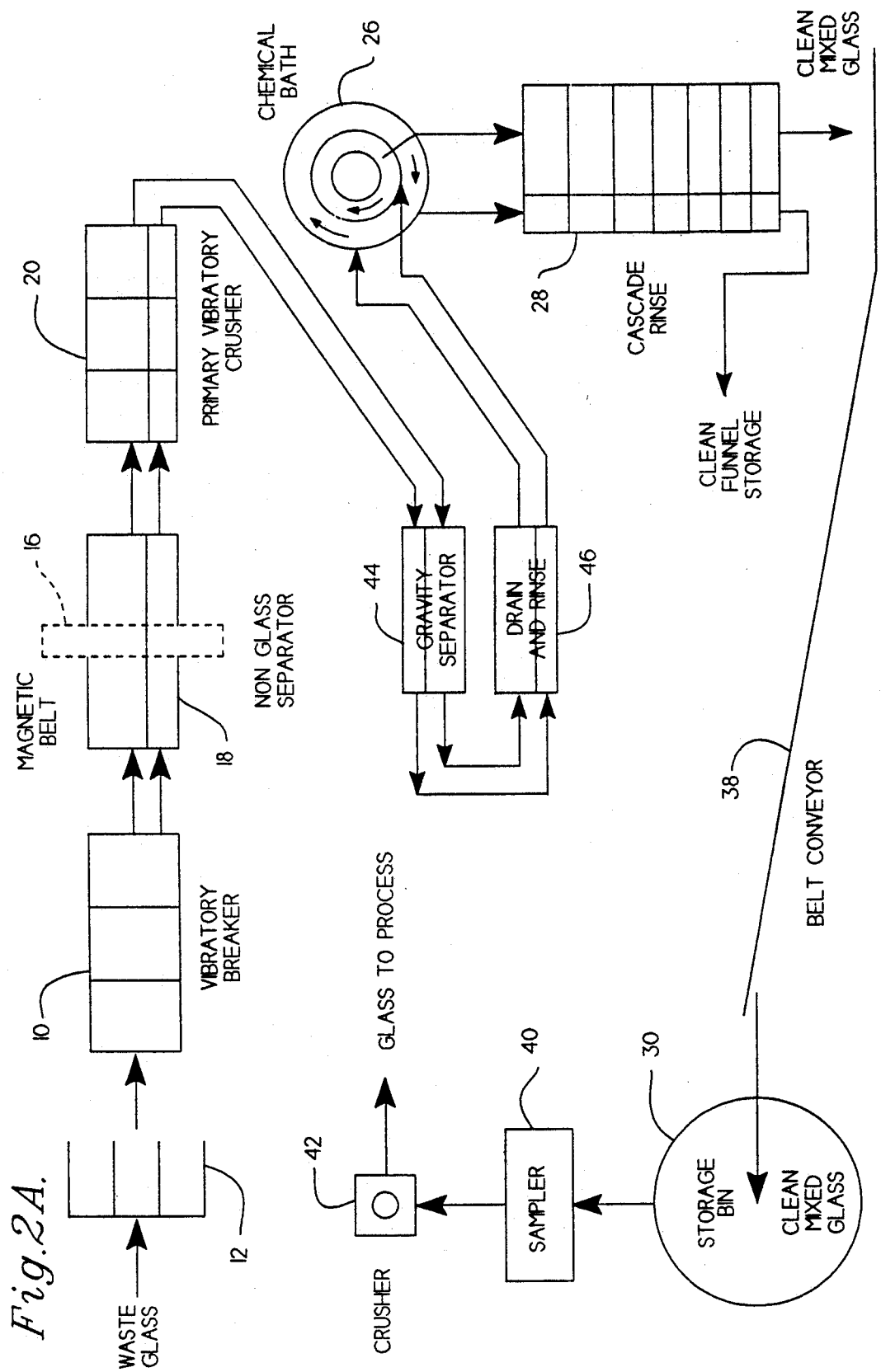
FIG. 2A is a schematic view of the steps of the process of FIG. 2 having two flow paths to accommodate initial separation and processing of different types of glass.

In the primary vibratory crusher 20, it is possible to separate the funnel glass from the panel glass. The funnel glass will be liberated first because of its greater friability. Panel glass is thicker and stronger. The separation can be optimized by adjusting the combination of the frequency of the vibrations and stroke $(5/16'' \frac{1}{8} \times \frac{3}{8} \approx 900$ R.P.M.) to the friability of the types of glass being processed. Screens can be used to separate the glass into two size fractions. As mentioned above, the screens can also further reduce the amount of fines in the stream. A crude separation of this type can also be carried out in the vibratory breaker 10. The funnel glass breaks first into smaller pieces which fall through holes 76 in the lower surface 74 of screen deck 70. The panel glass breaks into larger pieces which stay on surface 74 and exit through outlet 82. The nonglass components are removed and the larger pieces of panel glass continue on through the process. Further refinement after an initial separation of glass types in the breaker 10 is recommended if a substantially pure stock of at least one type of glass is desired. If an initial separation occurs at the vibratory breaker 10 or at the primary crusher 20, there will be two streams of glass progressing through the process after such initial separation process as shown in FIG. 2A.

FIG. 3 illustrates an alternative direction for the process. Following separation of the coarse glass from the nonglass components, but prior to further size reduction in the primary crusher 20, the coarse glass may be cleaned by immersion in a chemical bath 26 for removal of the coatings or may first pass through a thermal process to remove specific organic coatings. Any suitable heat treatment sufficient to melt a specified organic coating without melting the glass to ease the removal of the coating from the glass surface will suffice.

GLASS CLEANING AND RINSING

Chemical bath 26 is preferably a circular vibratory conveyor similar to those typically used for despruing and sorting but having a trough of sufficient depth to hold both the liquid and glass pieces. If two streams of glass are being maintained because of an initial separation of glass type, the bath 26 will have two separate channels to maintain the integrity of the two glass streams. This design permits very effective scrubbing of the glass while using a minimum amount of cleaning fluid. As a result, less effluent must be treated for disposal.

A suitable fume hood is provided to remove hazardous or irritating fumes from the bath area. The chemicals used in the bath depends on the coatings to be removed from the surface of the glass. In the process for removing coatings from the funnel and panel glass of TV tubes, the bath is preferably an acid and, more preferably, an ammonium bifluoride or a hydrofluoric acid bath. An ammonium bifluoride solution, preferably having a concentration of about 1.5%, has been found to work well. The ammonium bifluoride is preferred due to the known hazards of hydrofluoric acid. The preferred residence time will vary up to about 10 minutes, and preferably, will be between about 5 to 10 minutes. Time periods longer than 10 minutes are possible but it has been found that, when coatings are to be removed from the glass of TV tubes with ammonium bifluoride or hydrofluoric acid, the glass is clean within a residence time of 10 minutes.

Figure 11:
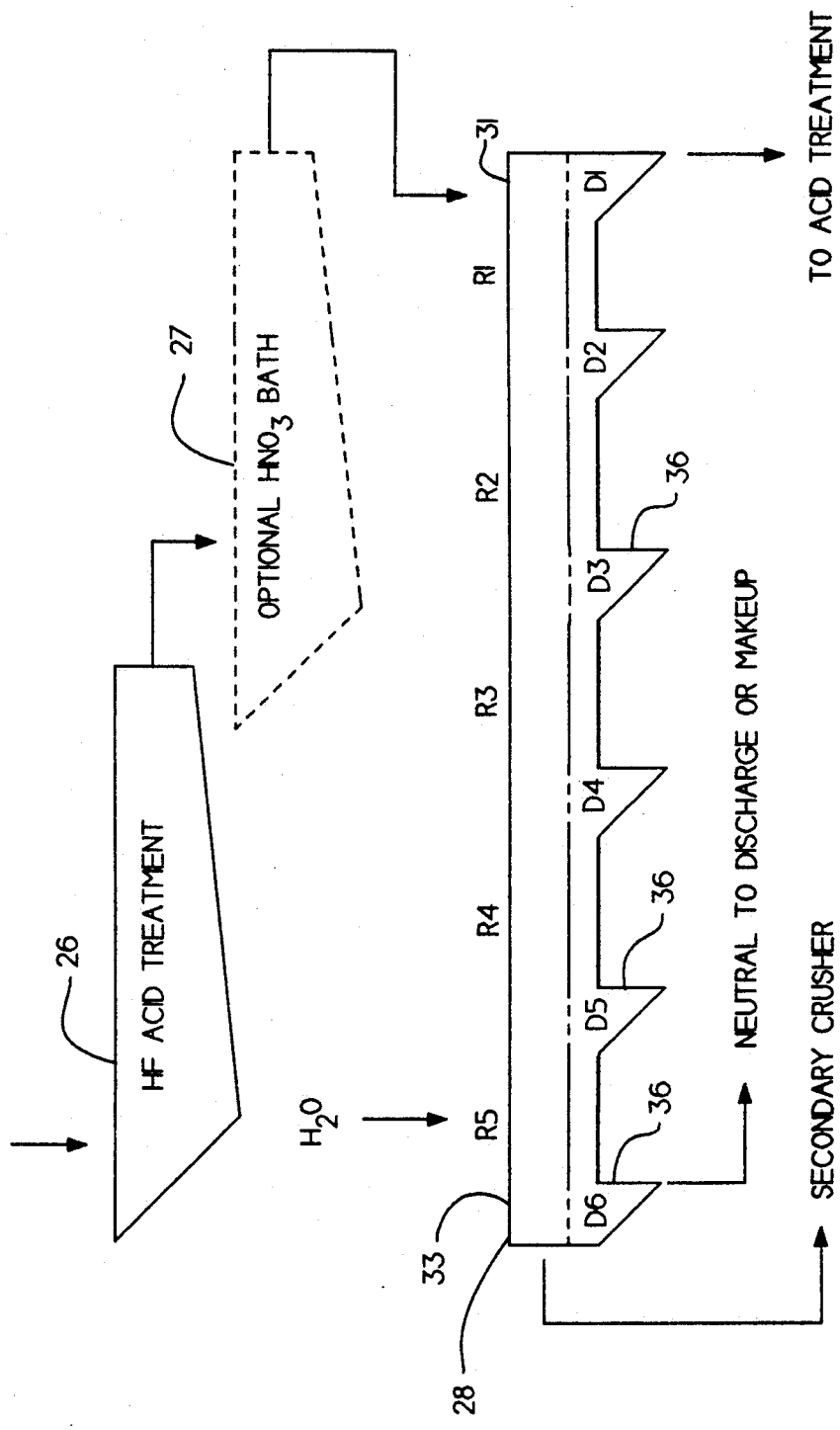
FIG. 11 is a schematic view of the cleaning and rinsing steps of the process of FIGS. 1-3.

As shown in Figure 11, an optional second bath 27 containing, for example, nitric acid for use in removing the frit bonding between the panel glass and funnel glass from TV tubes, may be used. Nitric acid may be mixed with the hydrofluoric acid or ammonium bifluoride solutions.

Following the chemical cleaning treatment, the glass is rinsed, preferably in a cascade washer 28. Any suitable known rinsing procedure will suffice, such as simply spraying the glass with water or some other suitable known rinsing agent. It has been found, however, that a countercurrent rinsing process not only effectively rinses the glass but conserves water use. Sumps 36, D1 to D6 in FIG. 11, collect the water for reuse. Thus, there is a minimal amount of waste water to treat. The chemically cleaned glass is drained of the cleaning solution, which is returned to the chemical bath 26. The drained glass enters the cascade washer 28 in a known manner at the upstream end 31 of the washer 28. The fresh water enters at the down stream end 33 of the cascade washer 28 and flows upstream so that the rinse water which first contacts the drained, chemically treated glass as it comes in from the chemical bath 26 has already passed over treated glass removing some of the coatings. The further downstream the glass flows, the cleaner (or less concentrated) the rinse water is, with the last rinse being just clean water. It has been found that the amount of water used in the rinse is not as important as the number of rinses. In FIG. 11, five rinsing steps are indicated, R1 to R5. The number of rinses can vary.

Studies were performed to evaluate methods of removing the coatings from the glass surfaces and to quantify the cleaning solution and rinse water requirements. The glass was cleaned by agitating the glass pieces in various cleaning solutions for 3 to 30 minutes under different conditions to establish equipment design parameters and the efficacy of the system.

The treatability study results are presented in Table 1.

TABLE 1

GLASS CLEANING TREATMENT TEST DATA

| TEST NO. | TEST DESCRIPTION | DESCRIPTION OF EFFECT ON GLASS | PERCENT WEIGHT LOSS THROUGH CLEANING |
|---|---|---|---|
| 1. | 20% sodium hydroxide with 5 minutes of mixing at ambient temperature. | Aluminum coating on panel glass is largely removed. Funnel glass pieces have some graphite coating remaining and iron oxide coating is unaffected visually. | See Test #6 |
| 2. | 20% sodium hydroxide solution with 10 minutes of mixing at ambient temperature. | Aluminum coating on panel glass is removed. Funnel glass pieces have some graphite coating remaining and visually the iron oxide coating is unaffected. | 1.3 |
| 3. | 20% sodium hydroxide solution with 5 minutes of mixing at 120° F. | Aluminum coating on panel glass is completely removed. Iron oxide coating on funnel glass pieces begins to pit and hence be very slightly removed. | 1.0 |
| 4. | 20% sodium hydroxide solution at 120° F. with 10 minutes for mixing. | Aluminum coating on panel glass is completely removed. Iron oxide coating on funnel glass pieces has pits open to glass surface; slight removal of iron oxide coating. | 1.0 |
| 5. | 20% sodium hydroxide 150° F. with 30 minutes for mixing. | Aluminum coating on on panel glass is completely removed. Funnel glass has partial iron oxide removal. Mixing has broken glass into smaller pieces. | 3.0 |
| 6. | Glass from Test #1 rinsed in tap water; and mixed 5 minutes in 15% hydrofluoric acid solution at ambient temperature. | Both panel glass and funnel glass pieces are cleaned. Funnel glass surface has a texture. Panel glass pieces have a few spots of white residue in recessed areas. | 7.2 |
| 7. | 5 minutes of mixing in 15% nitric acid solution at ambient temperature. | Panel glass has some aluminum coating removed (one piece has considerable coating left). Funnel glass pieces have some graphite coating remaining visually the iron oxide coating is unaffected. | 0.64 |
| 8. | Mix 10 minutes in 15% nitric acid solution solution at ambient temperature. | Aluminum coating on panel glass is completely removed. Iron oxide coating on funnel glass visually is unaffected. Some graphite coating remains. | 0.88 |
| 9. | Mix for 5 minutes in 15% nitric acid solution at 120° F. | Aluminum coating on panel glass is completely removed. Iron oxide and graphite coatings on funnel glass are unaffected visually. | 1.0 |
| 10. | Mix for 10 minutes in 15% nitric acid | Aluminum coating on panel glass is | 2.7 |

TABLE 1-continued
GLASS CLEANING TREATMENT TEST DATA

| TEST NO. | TEST DESCRIPTION | DESCRIPTION OF EFFECT ON GLASS | PERCENT WEIGHT LOSS THROUGH CLEANING |
|---|---|---|---|
| | solution at 120° F. | completely removed. Iron oxide and graphite coatings on funnel glass are unaffected. | |
| 11. | Mix 5 minutes in 15% hydrofluoric acid solution at ambient temperature. | Funnel glass pieces are clean and clear with textured surface. Smoked gray panel glass pieces are clean with white residue in recessed areas. | 6.8 |
| 12. | Mix 10 minutes in 15% hydrofluoric acid at ambient temperature. | Funnel glass pieces are clean and clear with a textured surface. Smoked gray panel glass pieces are clean with white residue in recessed areas. | 7.3 |
| 13. | Mix for 5 minutes at ambient temperature in solution of 15% hydrofluoric acid. | Funnel glass pieces are clean and clear with a textured surface. Smoked gray panel glass pieces are clean with only a small amount of a white residue in a couple of recessed areas. | 97.8 |
| 14. | Mix for 10 minutes at ambient temperature in solution of 15% hydrofluoric acid. | Funnel glass pieces are very clean and clear with a textured surface. Smoked gray panel glass pieces are clean with only a small amount of a white residue in a couple of recessed areas. | 9.2 |
| 15. | Mix for 3 minutes at ambient temperature in solution of 15% nitric acid and 15% hydrofluoric acid. | Funnel glass pieces are clean and clear with a textured or pitted surface. Smoked gray panel glass pieces are clean with a white residue in recessed areas. | 3.1 |
| 16. | Mix at ambient temperature for 5 minutes in phosphate ammonia bifluoride cleaning mixture. (100% as received). | Funnel glass pieces with graphite and iron oxide coatings are visually unaffected. Panel glass pieces are cleaned. | 0.73 |
| 17. | Mix for 5 minutes in 15% acid strength solution prepared using a blend of 90% conc. nitric acid plus 10% of phosphate ammonia bifluoride mixture. | Graphite and iron oxide coatings on the funnel glass pieces are unaffected visually. Coating on panel glass pieces is removed. | 1.2 |
| 18. | Mix at ambient temperature for 5 minutes in 15% acid strength solution prepared using a blend of 90% conc. hydrochloric acid plus 10% of phosphate ammonia bifluoride mixture. | Graphite and iron oxide coatings on funnel glass pieces are visually unaffected. Aluminum coating on panel glass is completely removed. | 0.59 |
| 19. | Mix for 5 minutes at ambient temperature in solution of 7½% hydrofluoric acid and and 7½% nitric acid. | Funnel glass pieces are clean and clear with a textured surface. Smoked gray panel glass pieces are clean. | 1.4 |
| 20. | Mix for 5 minutes at ambient temperature in solution of 3% hydrofluoric acid and 12% nitric acid. | Funnel glass pieces are clean and clear with a textured surface. Smoked gray panel glass pieces are clean. | 3.5 |
| 21. | Mix for 5 minutes at ambient temperature in solution of 1% hydrofluoric acid and 14% nitric acid. | Funnel glass pieces are very clean and clear with a textured surface. Smoked gray panel glass pieces are clean. | 1.1 |
| 22. | Mix for 5 minutes at ambient temperature in solution of 1% hydrofluoric acid and 9% nitric acid. | Funnel glass pieces are very clean and clear with a textured surface. Smoked gray panel glass pieces are clean. | 1.3 |
| 23. | Mix for 5 minutes at ambient temperature in solution of 1% hydrofluoric acid and 5% nitric acid. | Funnel glass pieces are very clean and clear with a textured surface. Smoked gray panel glass pieces are clean. | 1.5 |
| 24. | Mix for 5 minutes in a 1.5% ammonium bifluoride solution. | Funnel glass pieces are very clean and clear with a textured surface. Smoked gray panel glass pieces are clean. | 0.73 |
| 25. | Mix for 5 minutes in a 5% ammonium biflouride solution. | Funnel glass pieces are very clean and clear with a textured surface. Smoked gray panel glass pieces are clean. | 1.35 |
| 26. | Mix for 10 minutes in a 10% ammonium biflouride solution. | Funnel glass pieces are very clean and clear with a textured surface. Smoked gray panel glass pieces are clean. | 1.98 |

These results indicate that sodium hydroxide and nitric acid removed only the aluminum coating. The iron oxide coating is virtually unaffected by sodium hydroxide or nitric acid treatment, even at high temperatures.

The cleaning solutions containing from 1 to 15% hydrofluoric acid were effective in removing the internal and external coatings completely from the glass surfaces. The 1% hydrofluoric acid solution cleaned the glass surfaces within 5 minutes with agitation. The total reductions in the weight of the glass which resulted from cleaning with 1% and 15% hydrofluoric acid solutions were 1.5% and 6.8%, respectively. The weight loss due to cleaning increased proportionally as acid concentration and agitation time increased. The hydrofluoric acid alone was as effective as the mixture of hydrofluoric acid and nitric acid.

The treatability study results indicate that the ammonium bifluoride solution also removed the internal and external coatings from the panel and funnel glass with 5 minutes of agitation. The total weight losses of the glass during the cleaning operation with the 1.5%, 5%, and 10% ammonium bifluoride solutions were 0.7%, 1.3%, and 2.1%, respectively. These weight losses were significantly lower than those observed when cleaning with hydrofluoric acid.

Treatability studies were then performed to determine the cleaning bath life and the rinse water requirements. Various cleaning solutions were prepared and used until exhaustion. The cleaning solutions consisted of 1, 3, and 5% hydrofluoric acid solutions, a mixture of 1% hydrofluoric acid and 9% nitric acid, a mixture of 1% hydrofluoric acid and 5% nitric acid, and a 1.5% ammonium bifluoride solution. Approximately 100 grams of glass were added to 100 ml of each cleaning solution. After a 5 minute agitation period, the cleaning solution was decanted, and the cleaned glass samples were rinsed and dried. Another weighed increment of uncleaned broken glass was then added to the recovered cleaning solution and agitated for 5 minutes. Successive increments of uncleaned glass were cycled through the recovered cleaner until coating removal failed. The results indicate that when cleaning failed, the iron oxide coating remained on the glass. The tests also demonstrated that the mixture of hydrofluoric and nitric acid did not have a longer cleaning life or a reduced cleaning time as compared to the hydrofluoric acid alone. After three cleaning cycles using 1% hydrofluoric acid or 1.5% ammonium bifluoride i.e., after cleaning 30 grams of glass with 100 ml of the cleaning solution, the solutions were partially spent and the fourth batch could not be completely cleaned. The cleaning solutions containing 3% or 5% hydrofluoric acid were spent after 7 and 8 cycles, respectively. The test results are summarized in Tables 2 to 11.

TABLE 2

CLEANING SOLUTION RECYCLE TEST DATA
1% HF + 9% HNO$_3$

| Cycle | Percent Weight Loss | Glass Description |
|---|---|---|
| 1. | 0.92 | Both funnel and panel pieces are clean. |
| 2. | 1.6 | Both funnel and panel pieces are clean. |
| 3. | 1.6 | Funnel glass is 95% clean; panel pieces are clean. |
| 4. | 1.5 | Funnel glass is 50% clean; panel pieces are clean. |
| 5. | 1.0 | Funnel glass is 30% clean; panel pieces are clean. |

TABLE 3

CLEANING SOLUTION RECYCLE TEST DATA
1% NF + 9% HNO$_3$ (REPEATED TEST)

| Cycle | Percent Weight Loss | Glass Description |
|---|---|---|
| 1. | 1.4 | Both funnel and panel pieces are clean. |
| 2. | 3.7 | Both funnel and panel pieces are clean. |
| 3. | 1.4 | Funnel glass is 95% clean; panel pieces are clean. |
| 4. | 0.86 | Funnel glass is 95% clean; panel pieces are clean. |
| 5. | 0.96 | Funnel glass is 10% clean; panel pieces are clean. |

TABLE 4

CLEANING SOLUTION RECYCLE TEST DATA
1% HF + 5% HNO$_3$ (REPEATED TEST)

| Cycle | Percent Weight Loss | Glass Description |
|---|---|---|
| 1. | 1.5 | Both funnel and panel pieces are clean. |
| 2. | 0.77 | Both funnel and panel pieces are clean. |
| 3. | 1.4 | Both funnel and panel pieces are clean. |
| 4. | 1.5 | Funnel glass is 90% clean; panel pieces are clean. |
| 5. | 1.1 | Funnel glass is 85% clean; panel pieces are clean. |

TABLE 5

CLEANING SOLUTION RECYCLE TEST DATA
1% HF + 9% HNO$_3$ (REPEATED TEST)

| Cycle | Percent Weight Loss | Glass Description |
|---|---|---|
| 1. | 2.0 | Both funnel and panel pieces are clean. |
| 2. | 1.5 | Both funnel and panel pieces are clean. |
| 3. | 1.3 | Funnel glass is 55% clean; panel pieces are clean. |
| 4. | 0.63 | Funnel and panel pieces are clean. |
| 5. | 0.33 | Funnel glass is 50% clean; panel pieces are clean. |

TABLE 6

CLEANING SOLUTION RECYCLE TEST DATA
1% HF + 2.5% HNO$_3$

| Cycle | Percent Weight Loss | Glass Description |
|---|---|---|
| 1. | 0.96 | Both funnel and panel pieces are clean. |
| 2. | 0.87 | Both funnel and panel pieces are clean. |
| 3. | 0.37 | Funnel glass is 50% clean; panel pieces are clean. |
| 4. | 0.87 | Funnel glass is 50% clean; panel pieces are clean. |
| 5. | 0.73 | Funnel glass is 50% clean; panel pieces are clean. |

TABLE 7

CLEANING SOLUTION RECYCLE TEST DATA
1% HF

| Cycle | Percent Weight Loss | Glass Description |
|---|---|---|
| 1. | 1.5 | Both funnel and panel pieces are clean. |
| 2. | 1.3 | Both funnel and panel pieces are clean. |
| 3. | 0.71 | Both funnel and panel pieces are clean. |
| 4. | 0.74 | Funnel glass is 75% clean; panel pieces are clean. |
| 5. | 0.63 | Funnel glass is 30% clean; panel pieces are clean. |

TABLE 8

CLEANING SOLUTION RECYCLE TEST DATA
1.5% AMMONIUM BIFLUORIDE

| Cycle | Percent Weight Loss | Glass Description |
|---|---|---|
| 1. | 0.73 | Both funnel and panel pieces are clean. |
| 2. | 1.12 | Both funnel and panel pieces are |

TABLE 8-continued

CLEANING SOLUTION RECYCLE TEST DATA
1.5% AMMONIUM BIFLUORIDE

| Cycle | Percent Weight Loss | Glass Description |
|---|---|---|
| 3. | 1.2 | Both funnel and panel pieces are clean. |
| 4. | 1.33 | Funnel glass is 25% clean; panel pieces are clean. |

TABLE 9

CLEANING SOLUTION RECYCLE TEST DATA
1% HF (REPEATED TEST)

| Cycle | Percent Weight Loss | Glass Description |
|---|---|---|
| 1. | 1.3 | Both funnel and panel pieces are clean. |
| 2. | 1.5 | Both funnel and panel pieces are clean. |
| 3. | 0.74 | Both funnel and panel pieces are clean. |
| 4. | 0.72 | Funnel glass is 25% clean; panel pieces are clean. |
| 5. | 0.84 | Funnel glass is 80% clean; panel pieces are clean. |
| 6. | 1.6 | Funnel glass is 25% clean; panel pieces are clean. |

TABLE 10

CLEANING SOLUTION RECYCLE TEST DATA
3% HF

| Cycle | Percent Weight Loss | Glass Description |
|---|---|---|
| 1. | 2.6 | Both funnel and panel pieces are clean. |
| 2. | 1.2 | Both funnel and panel pieces are clean. |
| 3. | 1.8 | Both funnel and panel pieces are clean. |
| 4. | 1.0 | Both funnel and panel pieces are clean. |
| 5. | 1.2 | Both funnel and panel pieces are clean. |
| 6. | 1.2 | Both funnel and panel pieces are clean. |
| 7. | 1.7 | Both funnel and panel pieces are clean. |
| 8. | 1.2 | Funnel glass is 75% clean; panel pieces are clean. |
| 9. | 1.2 | Funnel glass is 10% clean; panel pieces are clean. |

TABLE 11

CLEANING SOLUTION RECYCLE TEST DATA
5% HF

| Cycle | Percent Weight Loss | Glass Description |
|---|---|---|
| 1. | 4.3 | Both funnel and panel pieces are clean. |
| 2. | 1.7 | Both funnel and panel pieces are clean. |
| 3. | 1.7 | Both funnel and panel pieces are clean. |
| 4. | 1.7 | Both funnel and panel pieces are clean. |
| 5. | 1.5 | Both funnel and panel pieces are clean. |
| 6. | 1.0 | Both funnel and panel pieces are clean. |
| 7. | 1.3 | Both funnel and panel pieces are clean. |
| 8. | 1.4 | Both funnel and panel pieces are clean. |
| 9. | 1.4 | Funnel glass is 95% clean; panel pieces are clean. |
| 10. | 1.5 | Funnel glass is 98% clean; panel pieces are clean. |
| 11. | 2.7 | Both funnel and panel pieces are clean. |
| 12. | 2.7 | Funnel glass is 5% clean; panel pieces are clean. |
| 13. | 1.7 | Funnel glass is 2% clean; panel pieces are clean. |

In addition to evaluating methods of removing the coatings, and to ensure that the sequence of equipment was effective, studies were performed to determine the quantity of water required to adequately rinse the glass pieces after immersion in the cleaning solution. The cleaned glass was rinsed with 100 ml of tap water per 100 grams of glass. The first and second cycles of rinse water contained 209 mg/L and 23 mg/L fluoride, respectively. Since spray rinsing and more vigorous agitation are believed to provide better rinsing in a commercial setting than that of the batch/soak rinsing procedure used in laboratory treatment schemes, the rinsing of the glass pieces in a volume of water equal to the volume of cleaner used is concluded to be adequate for removing the excess cleaner from the glass. Based on the treatability study results, the following conclusions can be derived: hydrofluoric acid or a mixture of hydrofluoric acid and nitric acid or ammonium bifluoride solution will adequately clean the glass in the sequence of the equipment selected from the system; the presence of nitric acid does not improve the cleaner life (but will, as stated below, dissolve the lead frit between the panel and funnel glass); and the weight loss from cleaning increases with the increase in the cleaning solution concentration.

In addition of the graphite coating, the funnel glass of TV tubes sometimes has a small area which is colored with a red dye on the outside surface. The dye in an inorganic red pigment in a solvent. The red dye is a coating applied as an aid to sealing the evacuation hole when air is evacuated from the tube. Since this red dye is more difficult to remove than either the graphite or the iron oxide coatings on the funnel glass, treatability studies were performed to evaluate the feasibility of removing it. Cleaning duration versus dye remaining is presented in Table 12. Approximately 50% of the dye remained after cleaning for 5 minutes with 1% hydrofluoric acid. Agitation during the period of times the pieces of glass are exposed to the hydrofluoric acid improves the amount of dye removed. Agitation may be continuous or intermittent. Agitation for 20 minutes in hydrofluoric acid removed substantially all of the dye.

TABLE 12

1% HF CLEANING OF FUNNEL GLASS RED COLORED COATED AREAS

| | Description of Effect on Glass |
|---|---|
| 1. Funnel glass pieces containing red colored areas soak in 100 ml 1% HF for 5 minutes. | Funnel glass has iron oxide completely removed. Red colored area is approximately 50% clean. |
| 2. Agitate the glass and cleaner of item No. 1 above for 5 minutes. | Red colored area is approximately 75% clean. |

TABLE 12-continued

1% HF CLEANING OF FUNNEL GLASS RED COLORED COATED AREAS

| | Description of Effect on Glass |
|---|---|
| 3. Re-agitate the glass and cleaner solution of item above No. 2 for an additional 5 minutes. | Red colored area is approximately 95% clean. |
| 4. Re-agitate the glass and cleaner solution of item No. 3 for 5 minutes additional time. | Red colored area is approximately 99% clean. |
| Analyses of glass and cleaner: | |
| Weight of glass tested, grams | 89.9 |
| Percent weight loss through cleaning | 3.8 |
| Used cleaner (after 15 minute) sludge volume, % | <1 |

When the picture tubes are broken, the resulting glass pieces are either panel glass, funnel glass, or a mixture of panel and funnel glass joined by frit material. Since thorough separation of the panel glass and funnel glass would be advantageous, a procedure for removing the frit was investigated.

It was found that the frit was completely dissolved within 10 minutes when the glass pieces with the exposed frit were agitated in a 12% nitric acid solution. Agitation may be continuous or intermittent.

The results of the glass cleaning treatability study indicated that either the 1% hydrofluoric acid or 1.5% ammonium bifluoride cleaning solution could remove the coatings completely for three cleaning cycles. The process is suitable for either continuous or batch processing subject to the performance of the cleaning solutions and the requirements of the cleaning process. The cleaning solutions are not completely spent after three cycles, and they might be able to remove thinner coatings for additional cycles. A cycle consisted of cleaning 100 grams of glass agitated with 100 ml of cleaning solution.

SECONDARY CRUSHING

Figure 12:
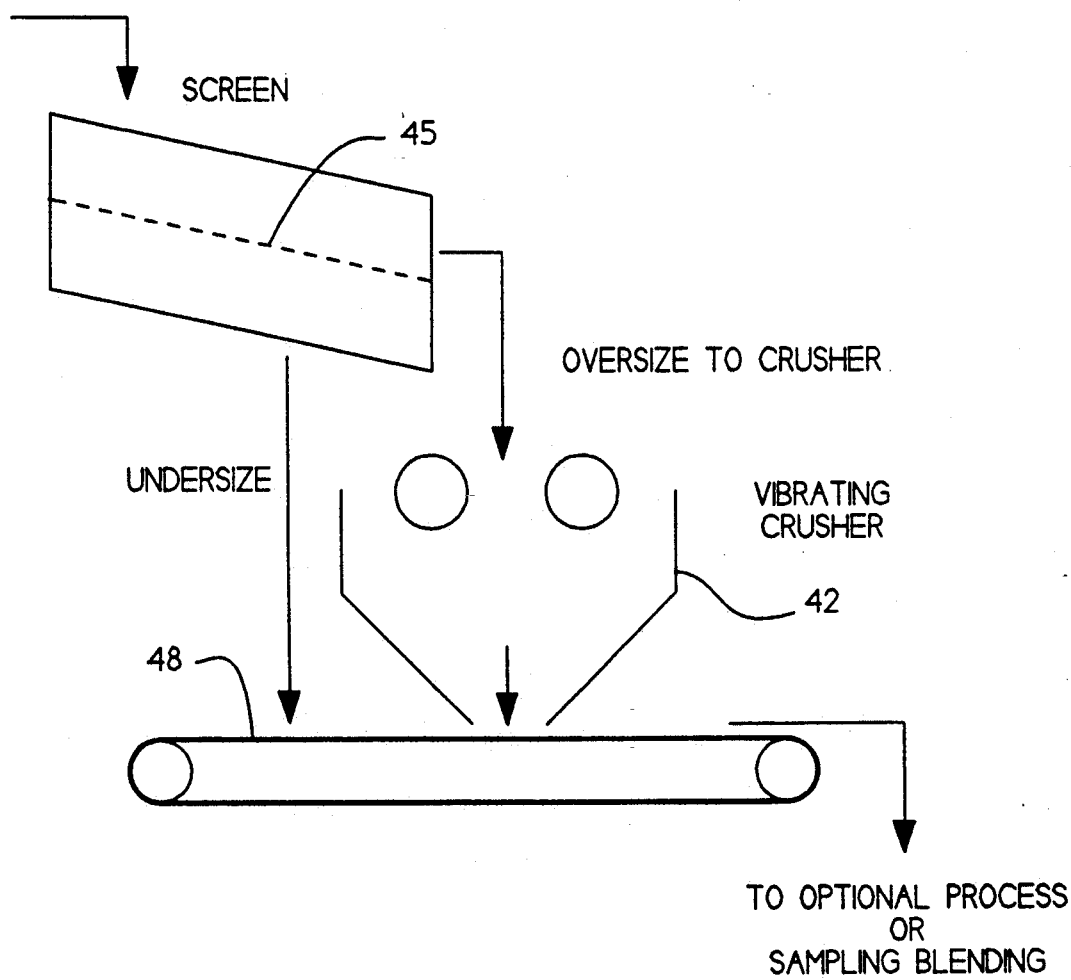
Figure 12 is a schematic view of the primary crushing step of the process of FIGS. 1-3.
Figure 15:
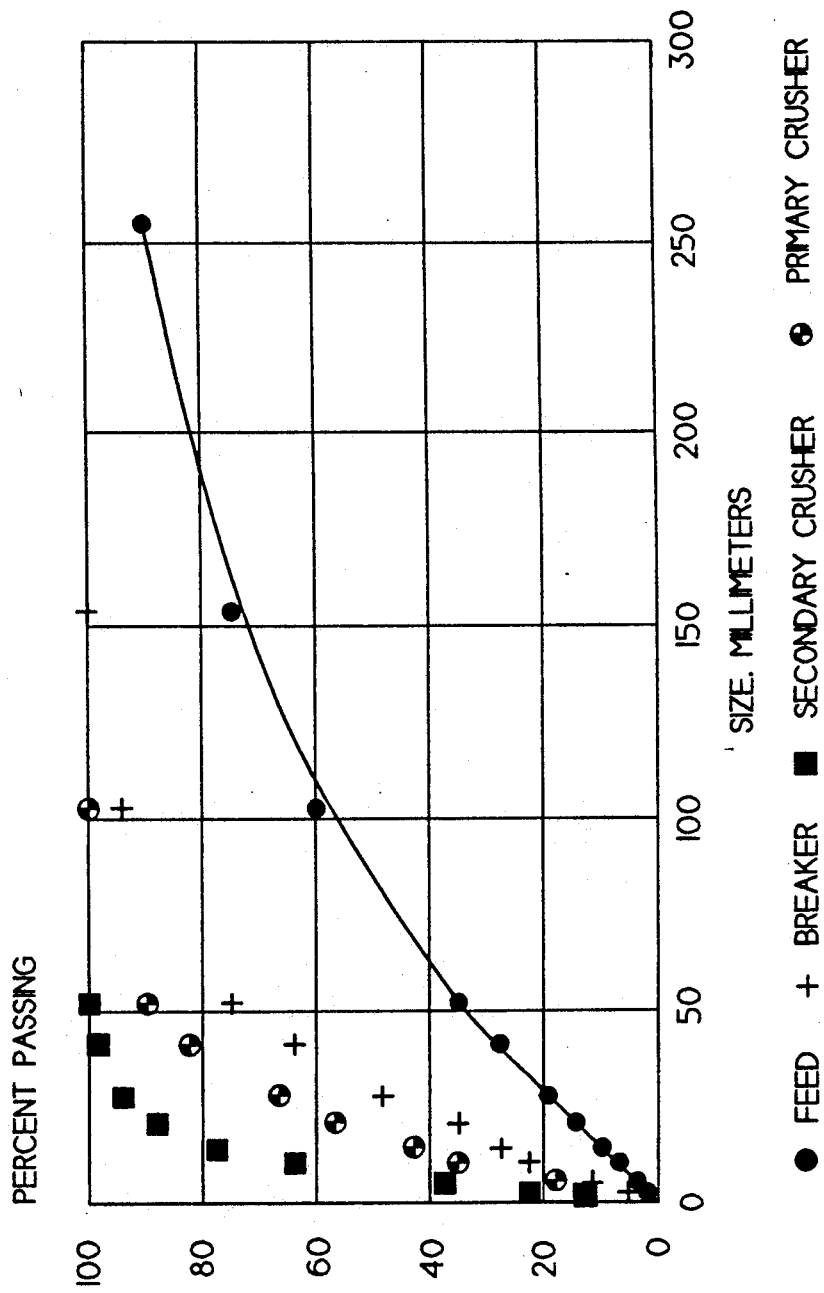
FIG. 15 is a graph showing the target size distribution of the glass during various stages of the process.

Following the cleaning and rinsing steps, the glass pieces may be further screened to make sure the pieces are all appropriately sized. Further crushing of the glass to a final desired size before sampling may be desired. Referring to FIGS. 12 and 15, a secondary crusher 42 of any suitable known type is provided for reducing the size of the glass to pieces no larger than about 2 inches. The screen 45 would be sized to permit pieces under about 1.5-2 inches to fall through to a conveyor 48. Oversized pieces would be directed to secondary vibratory crusher 42 for sizing to pieces less than 2 inches. The glass would be discharged from secondary crusher 42 to the conveyor 48 to join the screened glass for transfer to either the optional separation process or to storage and later sampling for analysis. The sized glass may then be melted down and mixed with the raw materials for new glass for use in new products. It is expected that up to 40% of glass in a new product can be from recycled glass.

The secondary crushing is optional. The glass may progress from the cleaning operation directly to sampling and analysis or the furnace for use.

STORAGE, SAMPLING AND ANALYSIS

The cleaned glass, as shown in FIG. 1, the preferred embodiment, may be moved along a belt conveyor 38 to a storage bin 30 or may be stored at ground level in separate walled containment areas.

Figure 13:
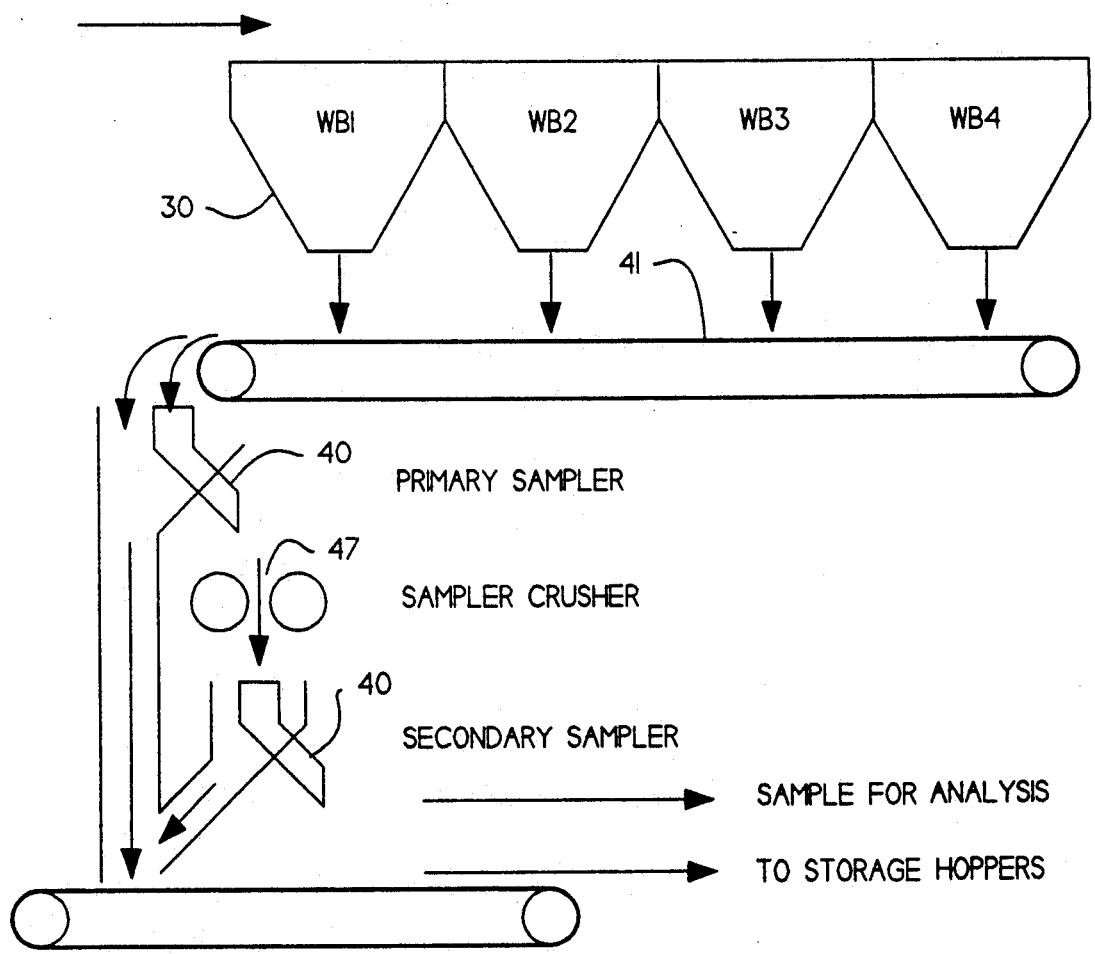
FIG. 13 is a schematic view of the sampling step shown in FIGS. I and 2.

Samples can be removed from the storage bin 30 for analysis by means of any suitable known sampler 40 as illustrated in FIG. 13. The glass is released from one of the storage bins 30 to a belt conveyor 41 which directs the glass to sampler 40. About 25% of the glass coming from conveyor 41 is directed to a primary sampler, then to the sample crusher 47. The glass released from the sample crusher 47 is split into two streams. About 10% of the sample exiting the sample crusher 47 goes on to the analyzer. The sample crusher 47 goes on to the analyzer. The remainder joins the 75% glass fraction from belt conveyor 41 which did not enter the sampler 40 for storage or melting in a furnace.

A neutron gauge analyzer, similar to those used to analyze coal samples, has been found to work well for glass composition analysis. The analyzer will measure the compositions of the glass pieces fed into it and provide that information in any suitable form. The preferred analyzer is a commercially available product which uses a shaking tube sample presentation technique coupled with two gauges, thermal neutron capture gamma analysis and gamma transmission. Pieces of glass of 2 inches or less are fed into an inlet hopper. The glass is bombarded with thermal neutrons from a radioisotope source. When a neutron is captured by the nucleus of an element in the glass, the nucleus contains excess energy. Gamma energies of one or more wave lengths are emitted from the excited nucleus depending on the element. Gamma rays emitted from each element's nucleus have specified values. The chemical analysis of the glass is calculated by known techniques on a microprocessor based on the neutron capture produced Gamma spectra.

Figure 16:
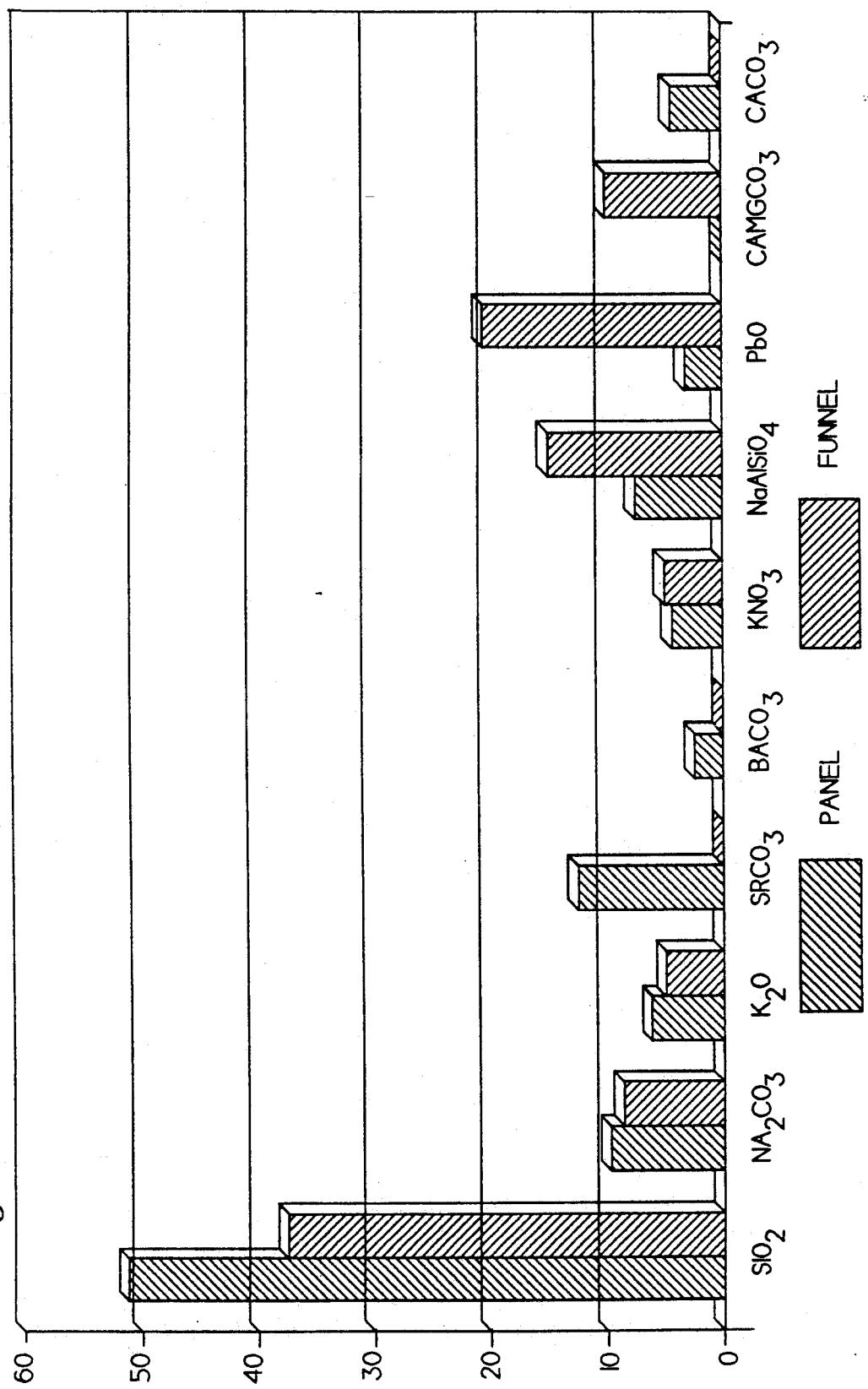
FIG. 16 is a graph showing the glass composition of panel and funnel glass.

FIG. 16 illustrates the difference in the chemical compositions of panel and funnel glass. It is important that glass adhere substantially, if not entirely, to the relative compositions established for that type of glass. Analysis prior to mixing with the raw materials for new glass may be important.

GLASS SEPARATION

Liberation of funnel glass from the mixed glass is possible by selective crushing, taking advantage of the differences in the friability of the glass. When a more reliable separation is desired, the following techniques can be used.

Figure 17:
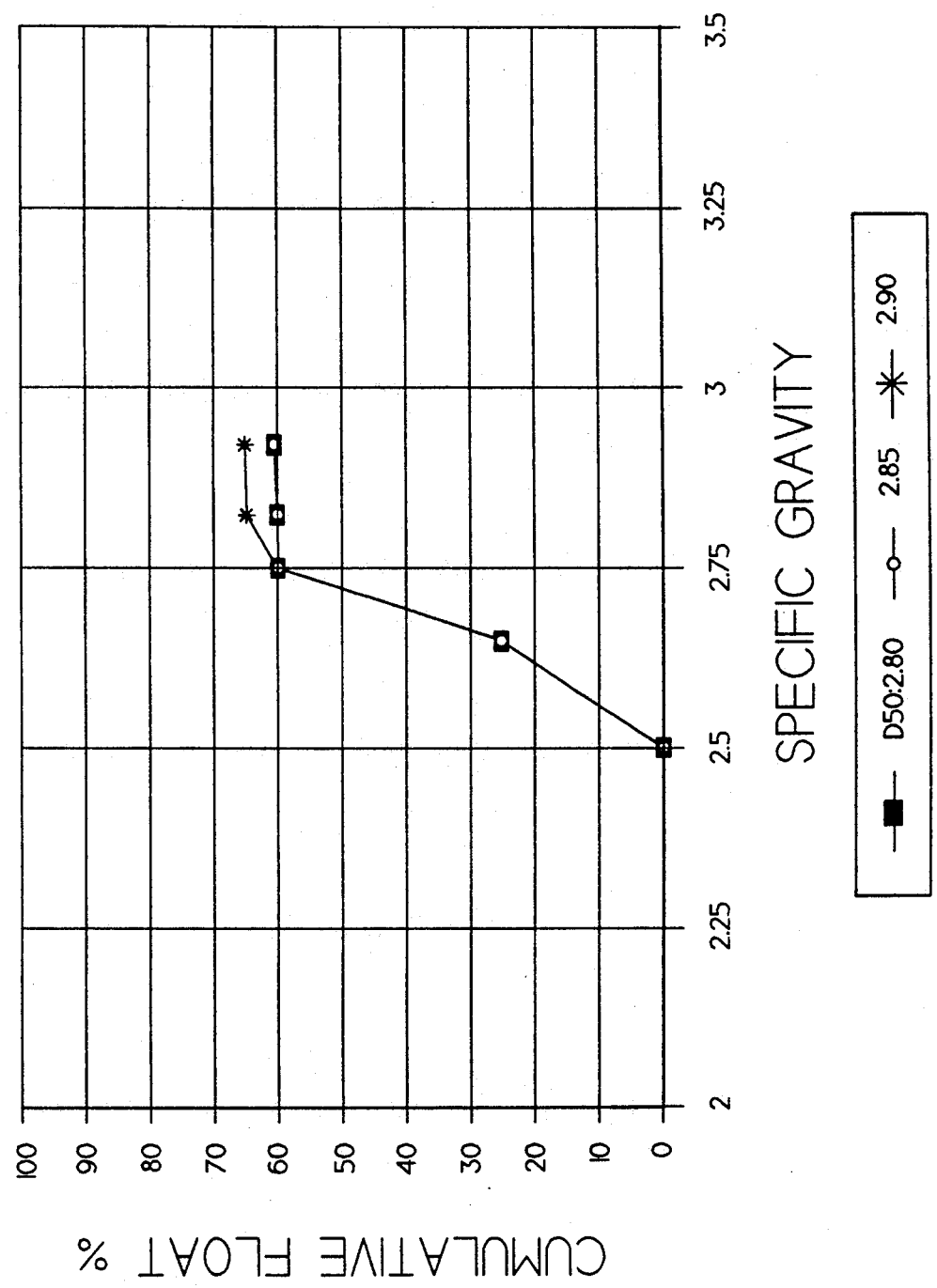
FIG. 17 is a graph showing the relationship between the specific gravity of panel and funnel glass and the cumulative float percentage in the glass type separation step.

Referring to FIGS. 2 and 3, an optional step of separating one of the types of glass from the other is provided. The separation step is based on the difference in density between glass types. FIG. 17 illustrates the cumulative percentage of glass at certain specific gravities that will float on the separation medium preferably used in the separation step of the present invention.

The specific gravity of panel glass is about 2.7. Slight variations in the panel glass specific gravity exist among various glass suppliers. The specific gravity of funnel glass is about 2.8-2.9. In waste television tubes, a mixed glass fraction exists constituting both funnel and panel glass bonded by a frit. The specific gravity of this fraction is variable, but falls between that of panel and funnel glass.

A dense suspension medium of a recoverable material is used to suspend or float the lower density glass. The other, higher density glass will sink. Suspension mediums which may be employed are usually a water suspension of a fine high specific gravity material, such as magnetite, an organic liquid or ferro silicones. In the preferred application where funnel glass is to be separated from panel glass, the suspension medium should have a specific gravity of about 2.7. The specific gravity of the suspension media is chosen to optimize the separation. A series of tests were conducted to define the parameters of the separation process as it applies to waste TV tubes.

Tests were conducted to define the characteristics of the glass. By using high density organic liquids, mixtures of tetrabromoethane and commercially available mixtures or suspensions of organic and inorganic liquids, the separating densities were determined. The results are shown in Table 13.

TABLE 13

| LAB TESTS USING ORGANIC LIQUIDS | | | |
|---|---|---|---|
| SPECIFIC GRAVITY | WEIGHT PERCENT | | |
| FRACTION | FUNNEL | MIXED | PANEL |
| Float 2.6 | 0 | 0 | 0 |
| 2.60 × 2.70 | 25 | 0 | 0 |
| 2.70 × 2.80 | 10 | 25 | 0 |
| 2.80 × 2.84 | 0 | 5 | 0 |
| Sink 2.84 | 0 | 0 | 35 |

Table 14 sets forth the results of separation studies on mixed glass at three size levels using high density organic liquids.

TABLE 14

| LAB TESTS USING TETRABROMOETHANE SAMPLE: MIXED BROKEN GLASS LIQUID SPECIFIC GRAVITY - 2.84 | | | |
|---|---|---|---|
| | WEIGHT PERCENT | | |
| SAMPLE SIZE AND ID | FEED | FLOAT | SINK |
| Panel - Plus 2 inch | 50 | 50 | |
| Funnel - Plus 2 inch | 50 | | 50 |
| Panel - 2 inch by 28 mesh | 50 | 50 | |
| Funnel - 2 inch by 28 mesh | 50 | | 50 |
| Panel - Minus 28 mesh | 50 | 50 | |
| Funnel - Minus 28 mesh | 50 | | 50 |

The results demonstrate that perfect separation of funnel and panel glass can be achieved. Using samples of as-received glass sized to a maximum size of four inches, the mixed glass separated at gravities associated with the major component of the mixed glass, i.e., panel or funnel. The tests show that the funnel glass separates from the lighter glass fractions most effectively at a separation gravity in the range of about 2.85 to about 2.90, represented as D50 on the yield gravity curve in FIG. 17. In mineral processing, the separating gravity is usually referred to as the D50 point on a performance curve.

The data indicate that the better the funnel glass is separated from the mixed glass through selective sizing (i.e., at the vibratory breaker 10 and/or the primary crusher 20), the more pure funnel glass is obtained. It has been found further that when the frit is exposed, nitric acid washing as described above will provide a cleaner funnel fraction.

Although the foregoing tests demonstrate that high density organic liquids function successfully as the separation medium, such liquids may be too hazardous for commercial scale operations. It is preferred therefore, to use magnetite or ferro silicon suspended in water. The magnetite suspension medium of the present invention is a suspension of 80% solids. An anionic dispersant, such as ligno-sulfate or ammonium naphthalene sulfonic acid condensate polymer is added to the suspension medium to provide a low viscosity, pumpable medium having a relatively high density. The dispersant content is about 5% by weight of the solids content.

Magnetite water slurries having a solids content of up to about 50% are used in coal processing operations. It is known, however, that when the solids content is greater that about 40%, the slurry becomes too viscous and can't be pumped.

It has been unexpectedly found that the addition of dispersant to the magnetite/water mixture provides a low viscosity, high density suspension having about on 80% solids content. The magnetite suspension of the present invention is pumpable.

Several tests were conducted using commercially available magnetite. Commercial magnetite is available in various grades generally designated A to E with the mean particle size becoming increasingly finer from grade A to grade E. It was found that A grade magnetite was difficult to pump but resulted in effective separation. E grade magnetite provided a pumpable slurry upon the addition of a dispersing agent.

A preferred media for the separation step is ferro silicon with a high iron content. Ferro silicon, having a specific gravity of 5.0 to 5.5, is higher in density than magnetite, which has a specific gravity of 4.0–5.0.

Referring to FIG. 2, glass passes to the gravity separator 44 following further sizing in the primary vibratory crusher 20. In the embodiment of the process where the difference in friability of panel and funnel glass is employed to make an initial separation of the two glass types, following the further sizing of the glass in the primary vibratory crusher 20, two streams of glass flow to a gravity separator 44. The panel rich fraction side of the gravity separator 44 is essentially a dry vibratory conveyor. The funnel rich fraction side is equipped as a dense media vessel with circulating pumps and discharges for the float and sink glass fractions. The float fraction will consist of any remaining panel glass and mixed glass, while the sink fraction will consist of higher specific gravity funnel glass. In commercial processing, it is desirable to insure a pure fraction of funnel glass. The benefit may justify some inefficiencies in the float fraction so that the sink fraction at best, will not contain any panel glass and at worst, will only contain insubstantial amounts of panel glass. The float fraction may contain some funnel glass.

The float and sink fractions are fed to a split drain and rinse screen 46 to maintain the integrity of the fractions. The glass flows over the screen, letting most of the suspension media fall through the screen to be returned to the dense media separating vessel. Some of the suspension medium will remain with the glass (estimated to be approximately one pound of media per ton of glass processed).

The rinsed float fraction containing panel and mixed glass is combined with the dry fraction of panel rich glass and directed toward the appropriate section of the chemical bath 26. The rinsed sink fraction of substantially pure funnel glass is directed to a second section of the chemical bath 26.

The remaining media will be removed when the fractions progress onto the cleaning and rinsing steps. The chemical bath 26 and the cascade rinse 28 are each divided into two sections to maintain the integrity of the fractions. In the embodiment of the process diagrammed in FIG. 3, the cleaning step precedes the separation step. In that embodiment, additional rinsing following dense media separation is provided.

There are several options for glass separation offered by the process of the present invention as shown in FIG. 14. The glass separation can be directed to obtaining a stream of generally pure funnel glass and generally pure panel glass by taking advantage of the glass separation techniques at each step of the process and adjusting the specific gravity of the dense suspension medium accordingly. Alternatively, a second separation option having one fraction of substantially pure glass and a second fraction of mixed glass can be chosen. Finally, there may be no need or desire to separate glass types. Under those circumstances, a third option of producing only a fraction of mixed glass is shown. The various glass fractions may be analyzed to determine the composition before directing the fraction onto the furnace for melting and eventual mixture with new glass raw materials.

What we claim is:

1. An apparatus comprising:
   a first deck having an inlet to an elevated surface, a step leading to a lower surface and a first outlet from said lower surface, said elevated and lower surfaces having a plurality of openings therein of a predetermined size;
   a second deck in communication with said first deck through said openings and having a second outlet; and means for vibrating at least said first deck at a predetermined frequency and impact force effective for breaking glass into pieces sufficiently small to fall through said openings in said first deck to said second deck.

2. The apparatus recited in claim 1 wherein said second deck has a plurality of openings therein of a second predetermined size and further comprising a third deck in communication with said second deck through said openings in said second deck.

3. The apparatus recited in claim 1 further comprising means for channeling materials at least as large as said predetermined size of said openings in said first deck toward said first outlet.

4. The apparatus recited in claim 3 wherein said means for channeling materials toward said first outlet is a first wall on said lower surface having one end adjacent said step and another end adjacent said first outlet.

5. The apparatus recited in claim 1 further comprising means for channeling materials smaller than said predetermined size of said openings in sad first deck toward said second outlet.

6. The apparatus recited in claim 5 wherein said means for channeling materials toward said second outlet is a second wall having an end adjacent said second outlet.

* * * * *

UNITED STATES PATENT AND TRADEMARK OFFICE
CERTIFICATE OF CORRECTION

PATENT NO. : 5,246,174
DATED : September 21, 1993
INVENTOR(S) : Edward A. Vitunac and Edward A. Zawadzki It is certified that error appears in the above-identified patent and that said Letters Patent is hereby corrected as shown below:

Col. 11, line 56, Table 3, delete "1% NF" and substitute therefor --1% HF--.

Col. 14, line 42, delete "of" and substitute therefor --to--.

Col. 20, line 22, delete "sad" and substitute therefor -- said--.(second occurrence)

Signed and Sealed this

Thirtieth Day of August, 1994

Attest:

BRUCE LEHMAN

Attesting Officer

Commissioner of Patents and Trademarks